United States Patent
Schlipf et al.

(10) Patent No.: US 12,037,116 B2
(45) Date of Patent: Jul. 16, 2024

(54) HIGH-LIFT DEVICE CONNECTION ASSEMBLY AS WELL AS WING AND AIRCRAFT EQUIPPED THEREWITH

(71) Applicant: Airbus Operations GmbH, Hamburg (DE)

(72) Inventors: Bernhard Schlipf, Hamburg (DE); Martin Goetze, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/889,996

(22) Filed: Aug. 17, 2022

(65) Prior Publication Data
US 2023/0054504 A1    Feb. 23, 2023

(30) Foreign Application Priority Data
Aug. 18, 2021    (EP) ..................................... 21191970

(51) Int. Cl.
*B64C 9/02*    (2006.01)
*B64C 9/24*    (2006.01)

(52) U.S. Cl.
CPC . *B64C 9/02* (2013.01); *B64C 9/24* (2013.01)

(58) Field of Classification Search
CPC .... B64C 9/02; B64C 9/24; B64C 7/00; B64C 5/10; B64C 5/08; B64C 3/50
See application file for complete search history.

(56) References Cited

U.S. PATENT DOCUMENTS

| | | | |
|---|---|---|---|
| 2,948,493 A | 8/1960 | Trifonoff | |
| 4,469,297 A * | 9/1984 | Cole | B64C 13/30 244/215 |
| 2007/0102587 A1* | 5/2007 | Jones | B64C 9/22 244/214 |

(Continued)

FOREIGN PATENT DOCUMENTS

| | | |
|---|---|---|
| CN | 112238933 | 1/2021 |
| EP | 0 045 987 | 2/1982 |
| WO | 2021/037981 | 3/2021 |

OTHER PUBLICATIONS

Extended European Search Report dated Feb. 3, 2022, including the European Search Report and the European Search Opinion, for EP 21191970.9, 7 pp.

*Primary Examiner* — Tien Q Dinh
*Assistant Examiner* — Illiam L Gmoser
(74) *Attorney, Agent, or Firm* — Nixon & Vanderhye P.C.

(57) ABSTRACT

A high-lift device connection assembly (24) for movably connecting a high lift device (16) to a wing (14) of an aircraft (10) wherein a track (30) is movably guided between main rollers (38, 40, 42, 44). In order to provide an enhanced fall back safety feature in case of a failure of a roller the invention proposes a track catcher (92) to be attached to a structure (26) of the wing (14) and configured to bear a load imposed by the track (30) in case of a main roller failure, wherein the track catcher (92) has at least one first hook element (94, 94-1-94-4) engaged within a first recession (72) at a first side of the track (30) and at least one second hook element (96, 96-1-96-4) engaged with a second recession (74) at the second side of the track (30). Further, the invention relates to a wing and an aircraft equipped with such high-lift device connection assembly (24).

12 Claims, 18 Drawing Sheets

A-A

(56) References Cited

U.S. PATENT DOCUMENTS

| | | | |
|---|---|---|---|
| 2009/0127402 A1* | 5/2009 | Jaggard | B64C 9/24 |
| | | | 244/213 |
| 2011/0168849 A1* | 7/2011 | Parker | B64C 9/22 |
| | | | 244/214 |
| 2016/0083081 A1* | 3/2016 | Cowles, Jr. | F16C 17/10 |
| | | | 384/570 |
| 2020/0055589 A1 | 2/2020 | Debaisieux et al. | |
| 2023/0026241 A1* | 1/2023 | Edmunds | B64C 9/14 |

* cited by examiner

A-A

B-B

A-A

A-A

A-A

A-A

B-B

A-A

A-A

B-B

A-A

A-A

A-A

A-A

A-A

A-A

A-A

A-A

A-A

A-A

A-A

A-A

A-A

HIGH-LIFT DEVICE CONNECTION ASSEMBLY AS WELL AS WING AND AIRCRAFT EQUIPPED THEREWITH

RELATED APPLICATION

This application incorporates by reference in its entirety and claims priority to Europe patent application 21191970.9, filed Aug. 18, 2021.

BACKGROUND AND SUMMARY

The invention relates to a high-lift device connection assembly for movably connecting a high lift device to a wing of an aircraft.

High-lift devices such as slats are movably connected to a wing structure of an aircraft so that they can be moved between a retracted position and an extended position. Known high-lift device connection assemblies use a track in the form of a curved beam which is guided between upper and lower main rollers.

The invention may be embodied as a high-lift device connection assembly for movably connecting a high lift device to a wing of an aircraft comprising: a track for holding to the high-lift device and a guide arrangement to be installed on a structure of the wing for guiding a forward and backward moving of the track, wherein the guide arrangement has upper and lower main rollers and a first and second side guidance element. Further, the invention relates to a wing for an aircraft as well as to an aircraft equipped with such high-lift device connection assembly.

The invention may be embodied to provide an enhanced fall back safety feature for a high-lift device connecting assembly.

The invention may also be embodied as a high-lift device connection assembly for movably connecting a high lift device to a wing of an aircraft, comprising:
- a track for holding the high-lift device and a guide arrangement to be installed on a structure of the wing for guiding a forward and backward moving of the track, wherein the guide arrangement has upper and lower main rollers and a first and second side guidance element,
- wherein the track is a profiled beam with upper and lower surface elements to be contacted by the upper and lower main rollers, respectively, and at least one vertical element connecting the upper and lower surface elements and arranged offset from the outer sides of at least one of or both of the upper and lower surface elements such that a recession is formed at each side of the track, and
- wherein the guide arrangement comprises a track catcher configured to bear a load imposed by the track in case of a main roller failure, wherein the track catcher has at least one first hook element engaged within the recession at a first side of the track and at least one second hook element engaged with the recession at the second side of the track.

Each of the at least one first and second hook elements may comprise a protrusion projecting from a base into the recession. Also, each of the at least one first and second hook elements may be configured to be attached to the structure of the wing. Further, each of the at least one first and second hook elements may have a profile shape of an L, T or U.

Each of the at least one first and second hook elements may be integrated in a holder for a side roller of the side guidance element to form a single piece component. Also, the at least one first and second hook elements may have a curved upper or lower surface to be engaged with a curved upper or lower curved wall of the recession. Further, each of the at least one first and second hook elements is arranged with a clearance within the recession. Moreover, each of the at least one first and second hook elements may be integrated in a structure element of the structure of the wing to form a single piece component. Or, each of the at least one first and second hook elements may be integrated in the side guidance element to form a single piece component.

Each of the at least one first and second hook elements may be configured to be connected to the structure of the wing with at least one shim plate there between. Also, each of the at least one first and second hook elements may have a base through which a shaft for at least one of the main rollers passes. Each of the at least one first and second hook elements may have a free end arranged close to the at least one vertical element with a clearance there between configured to bear a load imposed by the track in case of a side guidance element failure.

The track catcher may have at least one hook element associated to any of the main rollers. The track catcher may have a C-shaped profile with a first leg on the first side and the first hook element on the end of the first leg, a second leg on the second side and the second hook element on the end of the second leg, and a web connecting the other ends of the first and second legs, wherein the web is arranged with clearance close to the upper surface of the upper surface element or to the lower surface of the lower surface element.

The track catcher may have upper and lower first and second hook elements. Also, the track catcher may have forward and aft first hook elements and/or forward and aft second hook elements.

The track catcher may have a first and second vertical surface arranged in parallel with clearance therebetween to a first and second side surface, respectively, of the upper or lower surface element and configured to bear a load imposed by the track in case of a side guidance element failure.

The track may have a U-shaped profile with flanges at each of the edges such that one of the upper and lower surface elements is formed by a web of the U-shaped profile and a first and second flange, the at least one vertical element is formed by a first and second leg of the U-shaped profile, and the other of the upper and lower surface elements is formed by a third and fourth flange at the ends of the first and second legs of the U-shaped profile.

The track may be curved to enable a bow shaped moving path of the high-lift device. The track may hold a slat as high-lift device.

The upper main rollers may comprise at least one inward upper main roller and at least one outward upper main roller with a distance in chord direction to the inward upper main roller. Also, the lower main rollers may comprise at least one inward lower main roller and at least one outward lower main roller with a distance in chord direction to the inward lower main roller. Further, each of the main rollers may have a bearing arranged on a shaft to be fixed between two structure elements of the wing.

The invention may include a wing for an aircraft, comprising at least one or several of the high-lift device connection assembly according to any of the aforementioned embodiments. Further, the invention may provides an aircraft, comprising at least one wing according to the aforementioned embodiment and/or at least one high-lift device connection assembly according to any of the aforementioned embodiments.

The invention may refer to kinematics of a high-lift device such as a slat. Especially, some embodiments may relate to slat-track kinematics. The invention may be embodied to provide a failsafe device for a moving kinematics of a high-lift device. Especially, embodiments of the invention provide a back-up load path structure for main rollers for supporting and guiding a track of a high lift device that can be move forward and backward in order to move the slat between the retracted and the extended position.

The invention may be embodied to address cases in which a main roller—forward or aft main rollers, upper or lower main rollers—fails which in some previous designs would disturb the whole function of the corresponding track station with the risk that the high-lift device does not work properly anymore. Therefore, the invention may be embodied as a back-up structure. This fail-safe system realized by a track catcher using hook elements ("funk hooks") engaging into side recessions of the track.

The embodiments of the inventions may have at least one of the following advantages: space allocation—less space of cross section assumed; weight saving and back-up side guidance A typical track is a profiled beam having flanges on each edge so that each of a first and second side of the track has a recession formed between the upper and lower flanges. With some embodiments, the flange sides also may cover failsafe functions as back-up side pads.

SUMMARY OF DRAWINGS

Embodiments of the invention are explained in more detail below with reference to the accompanying drawings in which.

DETAILED DESCRIPTION

Figure 1:
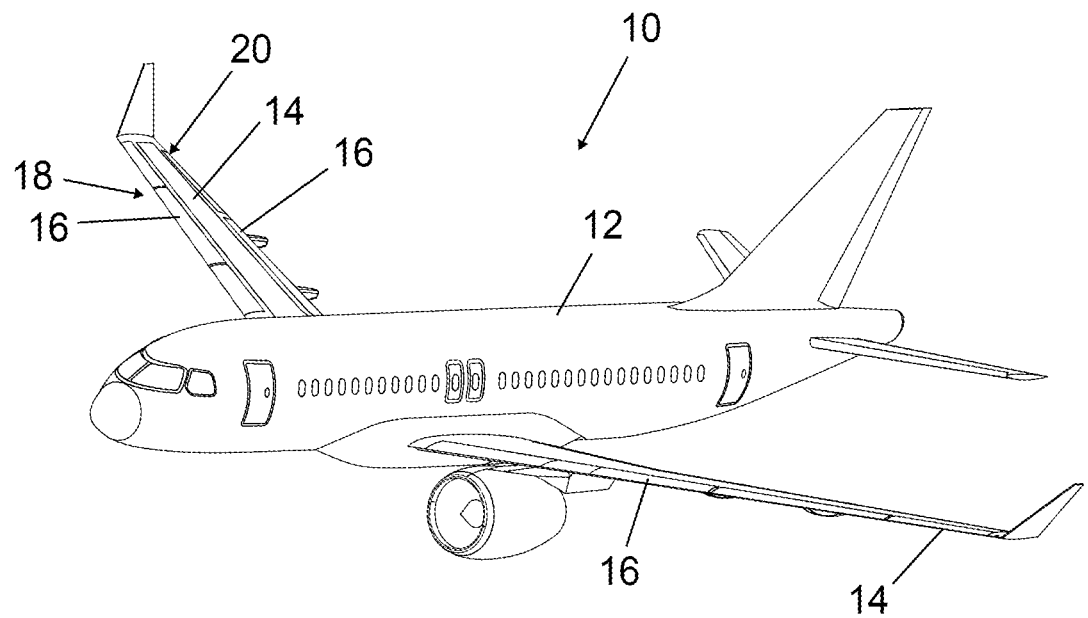
FIG. 1 is a perspective view of an airplane with high-lift devices.

FIG. 1 shows an aircraft 10 having a body 12 and wings 14 equipped with high-lift devices 16 on the leading edge 18 and on the trailing edge 20 of the wings 14.

Figure 2:
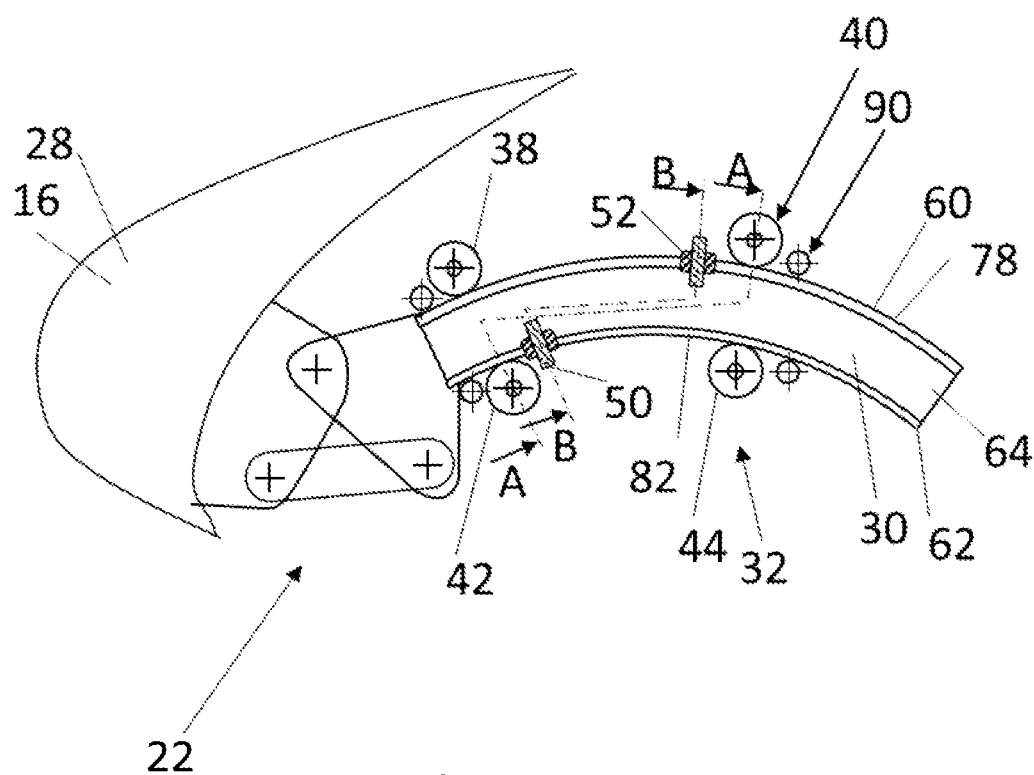
FIG. 2 is a side view, partially in section, of a conventional high-lift device connection arrangement.
Figure 3:
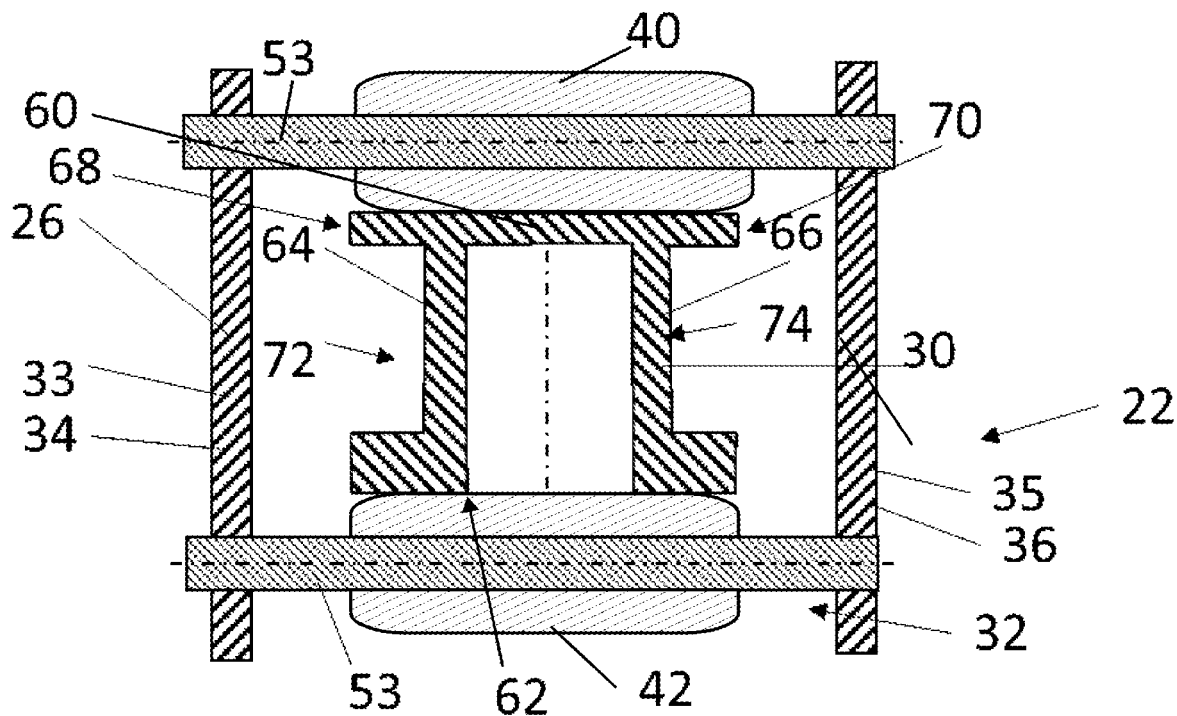
FIG. 3 is a sectional view along the line A-A of FIG. 2.
Figure 4:
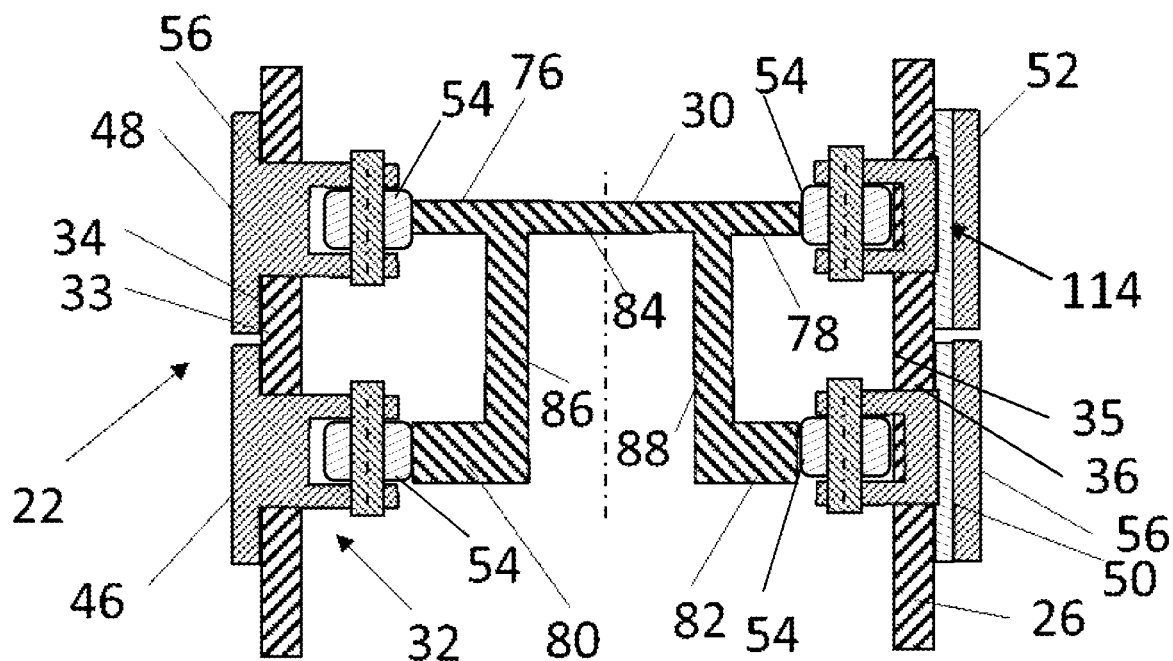
FIG. 4 is a sectional view along the line B-B of FIG. 2.
Figure 5:
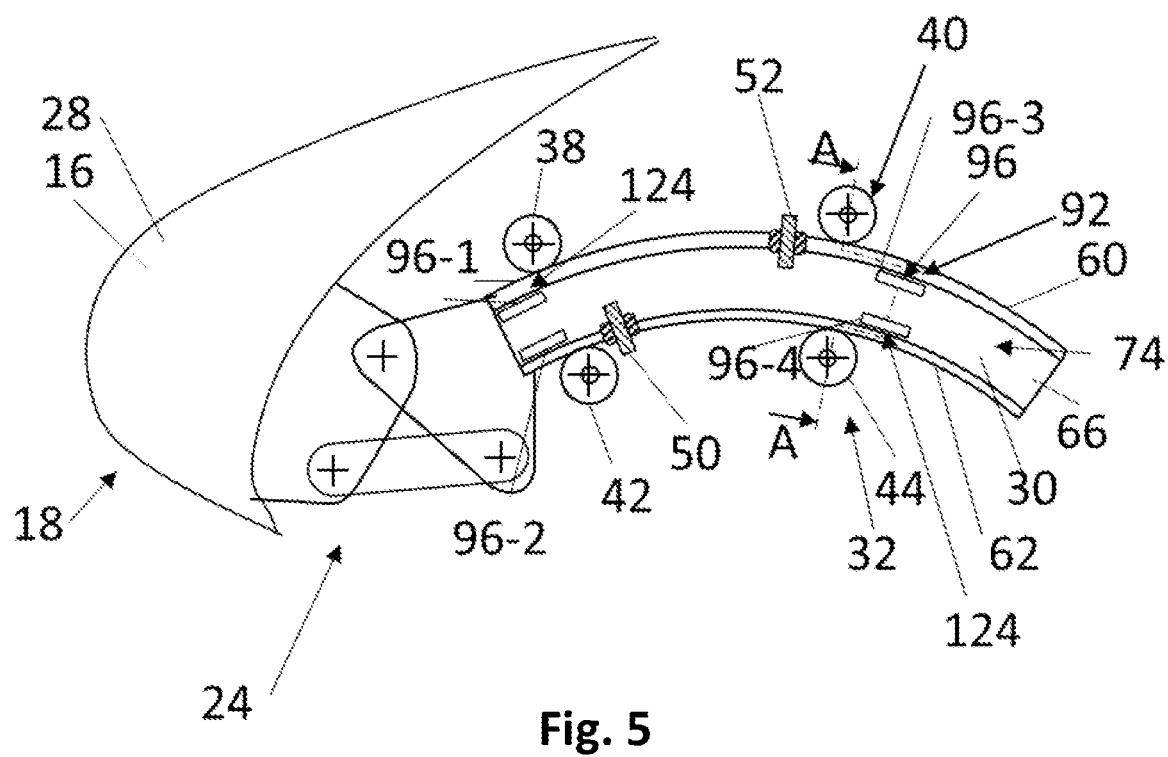
FIG. 5 is a side view, partially in section, of a high-lift device connection arrangement according embodiments of the invention.
Figure 6:
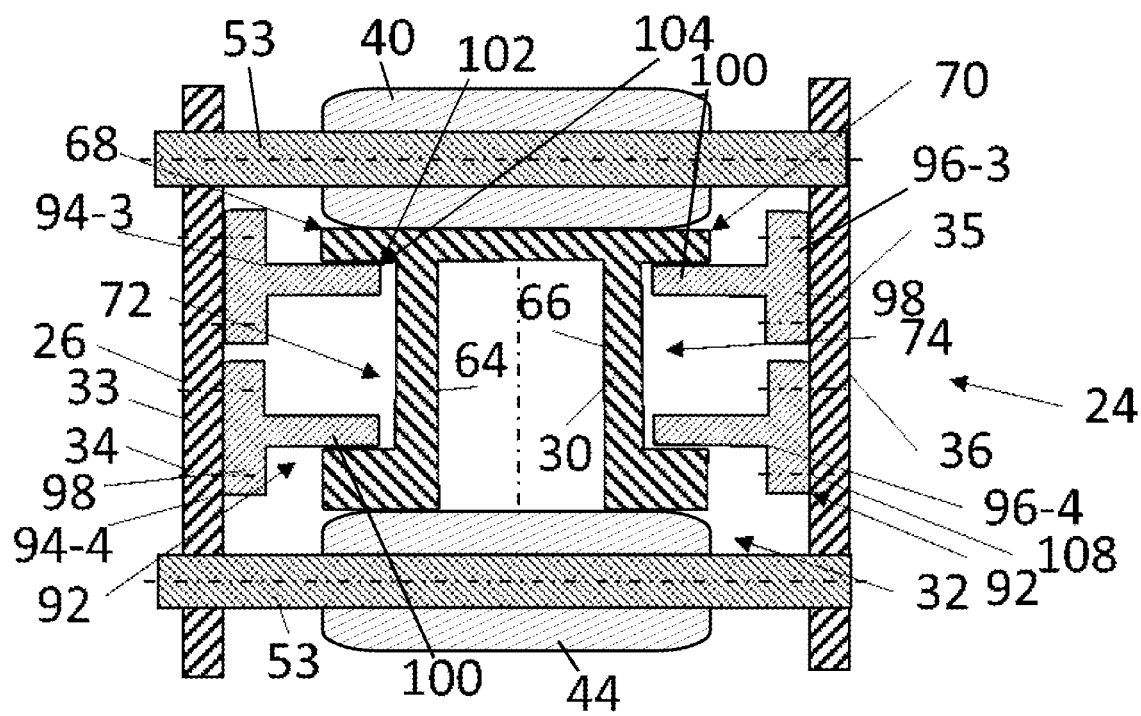
FIG. 6 is a sectional view along the line A-A of FIG. 5 according to a first embodiment of the invention.
Figure 6A:
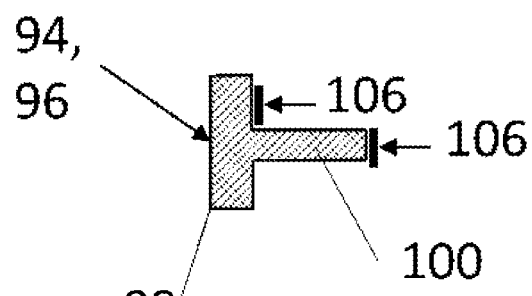
FIG. 6a is a modification of a hook element used in the first embodiment.
Figure 7:
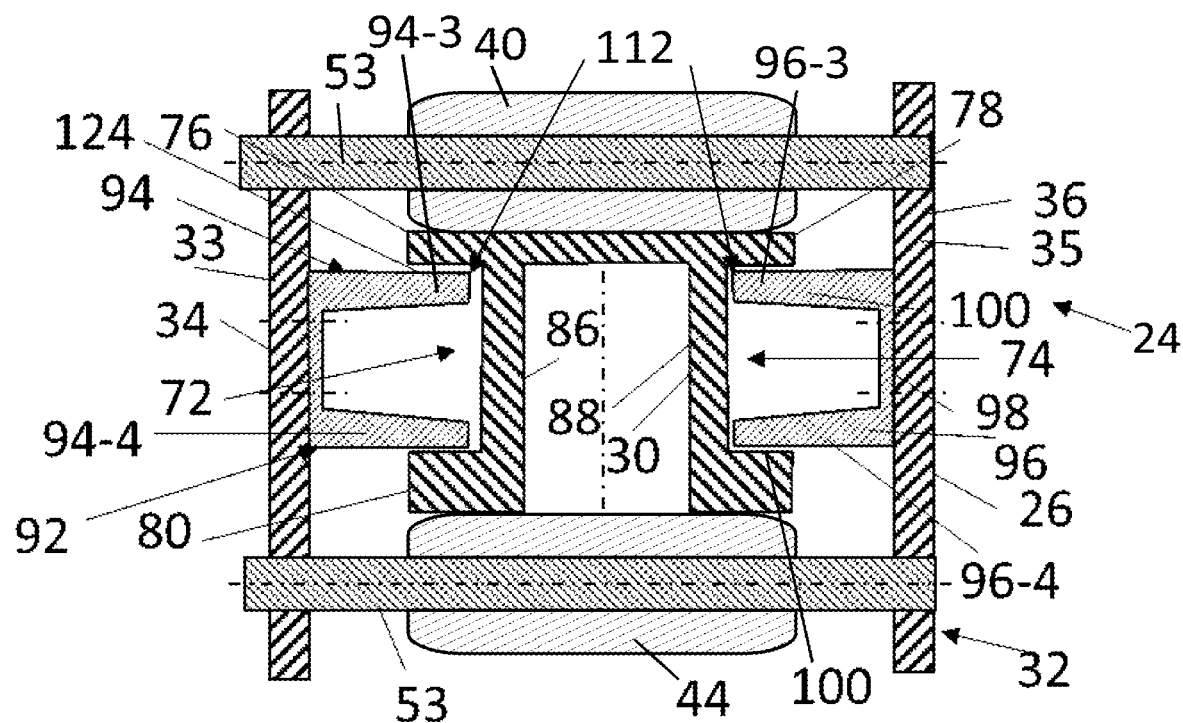
FIG. 7 is a sectional view along the line A-A of FIG. 5 according to a second embodiment of the invention.
Figure 7A:
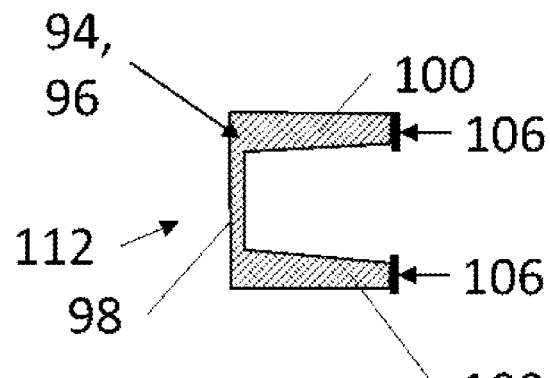
FIG. 7a is a modification of a hook element used in the second embodiment.

FIGS. 2 to 32 show different views of high-lift device connecting arrangements 22, 24 for connecting the high-lift devices 16 to a structure 26 of the wings 14 wherein FIGS. 2 to 4 show a conventional high-lift device connecting arrangement 22 and FIGS. 5 to 32 show a high-lift device connecting arrangement 24 according to embodiments of the invention. All corresponding elements bear the same reference numbers and are explained below only once.

While the high-lift device connecting arrangement 22, 24 are explained in the following by using the example of a connecting arrangement for connecting a slat 28 to a structure 26 on the leading edge of the wings 14, it should be noted that the principles explained also can be used for any other high-lift device which is hold by a track 30 to be moved in a guide arrangement 32.

The high-lift device connection assembly 22, 24 is configured to movably connect the high lift device 16, such as the slat 28, to one of the wings 14 of the aircraft 10.

The high-lift device connecting arrangement 22, 24 comprises a track 30 for holding the high-lift device 16 and a guide arrangement 32 to be installed on the structure 26 of the wing 14 for guiding a forward and backward moving of the track 30. The structure 26 includes a first structure element 33 on a first side of the high-lift device connecting arrangement 22, 24 and a second structure element 35 on a second side of the high-lift device connecting arrangement 22, 24. According to some embodiments the first structure element 33 is a first rib 34 of the wing 14, and the second structure element 35 is a second rib of the wing 14. The first side can be one of the inboard or outboard sides, and the second side is the other of the inboard and outboard sides.

The guide arrangement 32 has upper and lower main rollers 38, 40, 42, 44 and a first and second side guidance elements 46, 48, 50, 52.

According to some embodiments, the guide arrangement 32 comprises a forward upper main roller 38, an aft upper main roller 40, a forward lower main roller 42, and an aft lower main roller 44. The main rollers 38-44 have a bearing (generally known, not shown) such as a needle bearing and are supported each on a stationary shaft 53 fixed to the first and second structure elements 33, 35. The forward main rollers 38, 42 are arranged with a distance in chordwise direction to the aft main rollers 40, 44.

According to some embodiments, the guide arrangement 32 comprises at least two guidance elements 46, 48, 50, 52 on each of the first and second sides. At least one of the guidance elements 46, 48, 50, 52 on each side is configured to guide an upper portion of the track 30, and at least one of the guidance elements 46, 48, 50, 52 is configured to guide a lower portion of the track 30. Further, there are at least two guidance elements 46, 48, 50, 52 on each side which are shifted to each other in the spanwise direction so that at least one of the guidance elements 46-52 on each side guides a more forward portion of the track 30, while the at least one other guidance element 46-52 on each side guide a more backward portion of the track 30. The side guidance elements 46-52 may include side rollers 54 with a side roller support 56 and/or side guide pads 58.

The track 30 is a profiled beam with upper and lower surface elements 60, 62 to be contacted by the upper and lower main rollers 38-44, respectively, and at least one vertical element 64, 66, e.g., web, connecting the upper and lower surface elements 60, 62 and arranged offset from the outer sides 68, 70 of the upper and lower surface elements 60, 62 such that a recession 72, 74, e.g., recess, is formed at each of the first and second sides of the track 30.

According to some embodiments, the track 30 has a U-shaped profile with flanges 76, 78, 80, 82 at each of the edges such that one 60 of the upper and lower surface elements 60, 62 is formed by a web 84 of the U-shaped profile and a first and second flange 76, 78, the at least one vertical element 64, 66 is formed by a first and second leg 86, 88 of the U-shaped profile, and the other 62 of the upper and lower surface elements 60, 62 is formed by a third and fourth flange 80, 82 at the ends of the first and second legs 86, 88 of the U-shaped profile.

According to some embodiments, the track 30 is curved in order to enable a bow shaped moving path of the high-lift device 16.

The first recession 72 is defined by the first flange 76, the first leg 86 and the third flange 80 and has the form of a groove.

FIGS. 2 to 4 show the conventional high-lift device connecting arrangement 22. In most prior art aircrafts, the guide arrangement 32 of the leading-edge track 30 is realized by the main rollers 38-44 supporting the track 32 on the upper and lower side, in combination with side rollers 54 and eventually gliding pads 58 which are all attached to the leading edge ribs 34, 36. As a part of the leading edge high-lift system the track 30 is deploying and retracting the slat 28 in certain stages of the flight, allowing the wing 14 to operate at a higher angle of attack.

In order to provide a fall-back safety, the conventional high-lift device connecting arrangement 22 comprises safety pins 90 ("funk pin") located upside the upper surface element at a forward and backward position and downside the lower surface element at a forward and backward position.

FIGS. 5 to 32 show different embodiments of the high-lift device connecting arrangement 24 which does not comprise safety pins 90 but at least one or several track catchers 92 as a fall back safety feature in case of a failure of one of the main rollers 38-44.

The track catcher 92 is configured to bear a load imposed by the track 30 in case of a main roller failure. The track catcher 92 has at least one first hook element 94 engaged within the first recession 72 at the first side of the track 30 and at least one second hook element 96 engaged with the second recession 74 at the second side of the track 30. The term hook element means a flange or other protrusion extending into one of the recessions 72, 74 of the track 30.

In normal operation, the track catcher 92 is arranged with a clearance to the track. When any of the rollers 38, 40, 42, 44, 54 of the guide arrangement 32 fails, at least one of the hook elements 94, 96, such as a pair of first and second hook elements, slidingly contacts the track 30.

According to some embodiments, as shown in FIGS. 5 to 7a, 10 to 22, 25, 29 and 30, the track catcher 92 has at least one hook element 94, 96 associated to any of the main rollers 38-44. According to some embodiments, as shown in FIGS. 5 to 7a, 10 to 22, 25, 29 and 30, the track catcher 92 has, on the first side, a forward upper first hook element 94-1, an aft upper first hook element 94-2, a forward lower first hook element 94-3 and an aft lower first hook element 94-4, and, on the second side, a forward upper second hook element 96-1, an aft upper second hook element 96-2, a forward lower second hook element 96-3 and an aft lower first hook element 96-4.

The hook elements 94, 96, 94-1, 94-4, 96-1, 96-4 (which can also be named as safety hooks or "funk hooks") engage with the inner side of the slat track flanges 76-82. Thus, the upper hook elements 94-1, 94-2, 96-1, 96-2 engage with the lower side of the upper track flanges 76, 78, and the lower hook elements 94-3, 94-4, 96-3, 96-4 engage with the upper side of the lower track flanges 80, 82. In normal operation, there is a small clearance (e.g. 0.1 mm to 10 mm) between the hook element 94, 96 and the associated flange 76-82 which is so small that in case that the associated main roller is worn, and its diameter is reduced, the load of the track can be supported by the hook element 94, 96.

Figure 16:
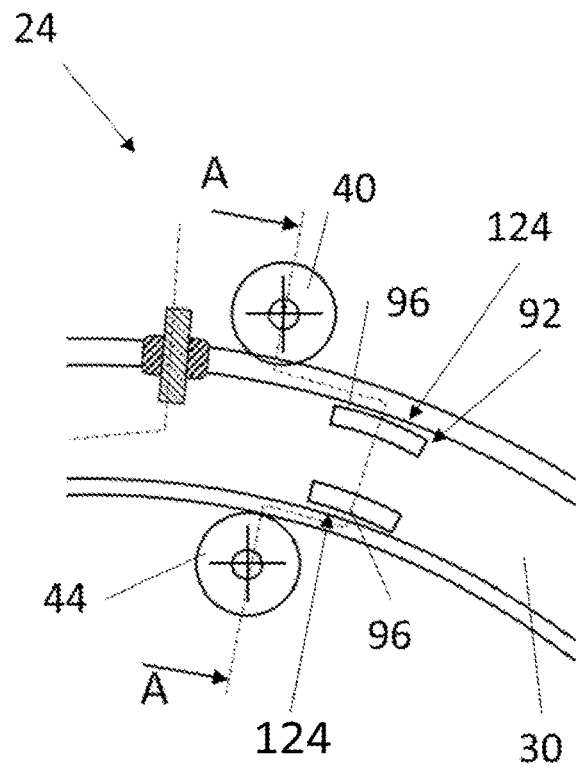
FIG. 16 is a detail of one of the FIG. 5 or 13 according to a variant which is possible for all of the embodiments of the invention.
Figure 17:
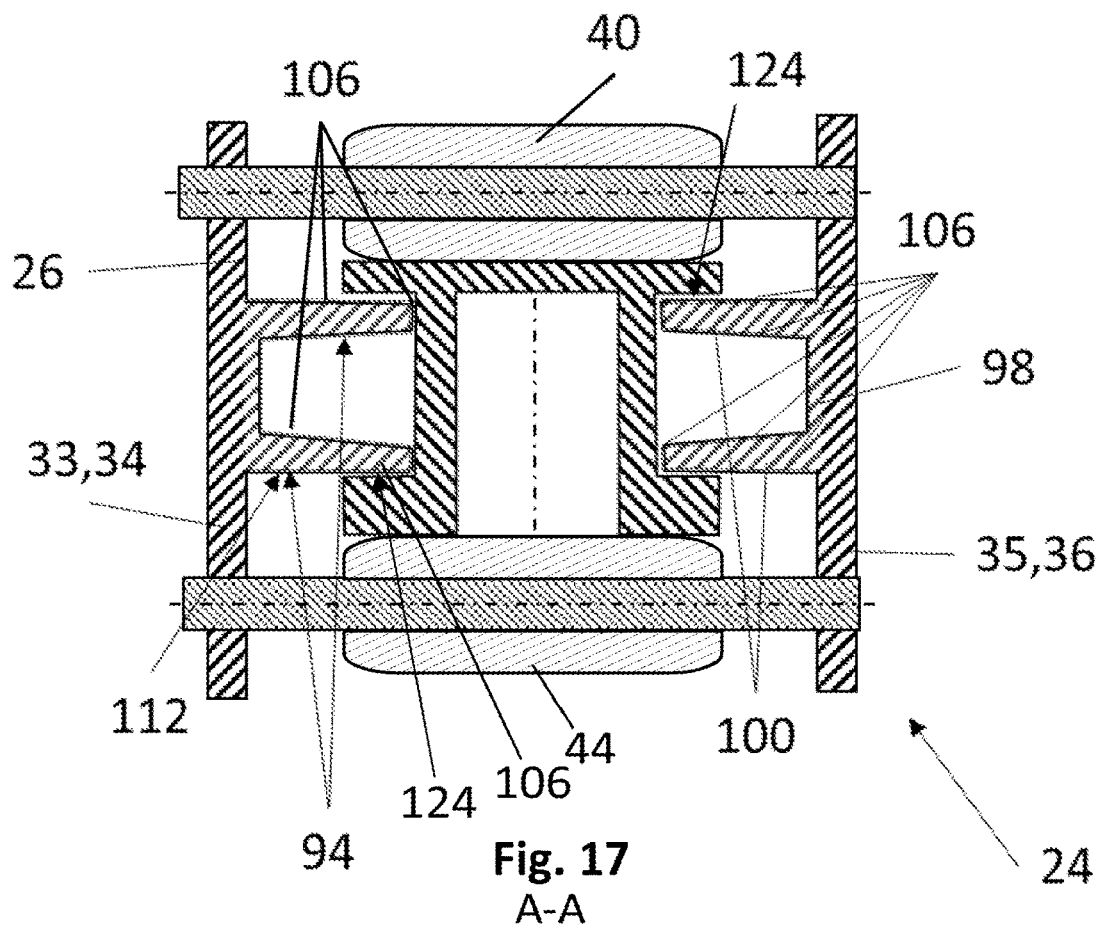
FIG. 17 is a sectional view along the line A-A of any of the FIG. 5, 13, 16, 18, or 20 according to a seventh embodiment of the invention.
Figure 18:
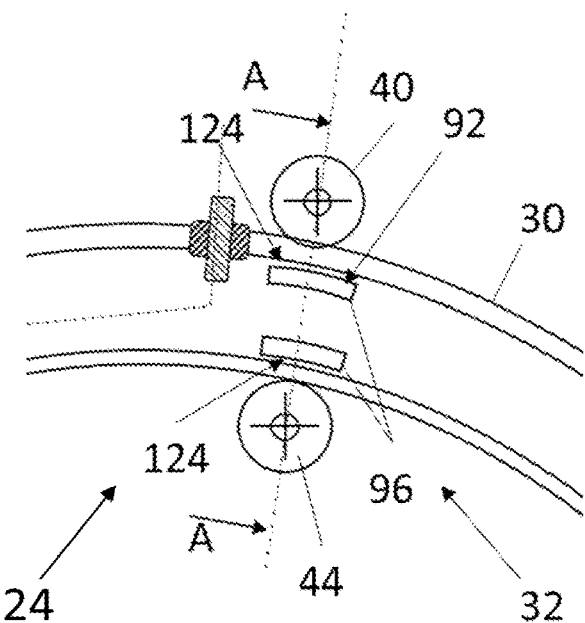
FIG. 18 is a view as in FIG. 16 according to an eighth embodiment of the invention.
Figure 19:
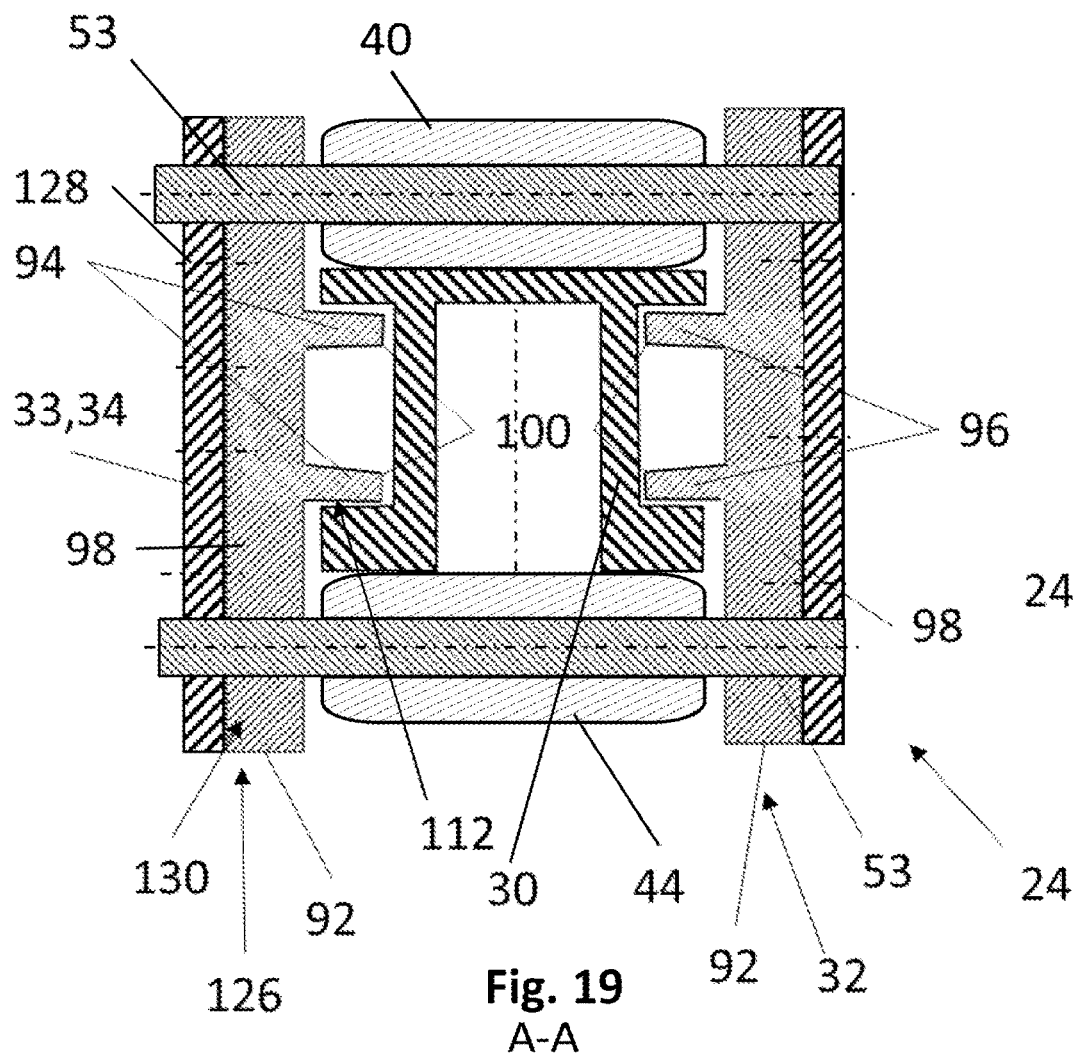
FIG. 19 is a sectional view along the line A-A of FIG. 18 according to the eighth embodiment of the invention.

As shown in FIGS. 16 and 18 the contact surfaces 124 of the hook elements 94, 96 facing the associated flange 76-82 may be curved. The curvature may be complementary to the curvature of the corresponding side of the flange 76-82, but also different curvatures are possible. According to some embodiments, protrusions 100 on which the contact surface 124 is formed may be curved as a whole with a radius, or only the contact surface may be formed with a radius. For stress reasons, it may advantageous that the radius of the contact surface 124 is different to the associated contact surface at the track 30. The contact surface 124 may have different curvatures at different portions thereof, for example another radius near the edges compared with an radius in the middle. The contact surface 124 may also be double-curved with an additional crown radius.

For the different embodiments shown there are potential functional surfaces 104 that can be used as Back-Up-Side-Pad to cover side-roller/side-pad-failures. For example, as shown in FIGS. 6a, 7a, 8a, and 9a, the contact surface 124 (and the corresponding contact surface at the track 30) may be provided with a friction liner 106.

According to the embodiments shown in the FIGS. 5 to 32, the hook elements 94, 96 comprise a base 98, and a protrusion 100 protruding from the base 98 into the corresponding recession 72, 74.

The protrusion 100 has a free end 102 arranged close to the at least one vertical element 64, 66 with a clearance therebetween configured to bear a load imposed by the track 30 in case of a side guidance element failure. Hence, the hook elements 94, 96 provide a functional surface 104 as a back-up side pad.

As shown in FIGS. 17 and 29 to 32 the hook elements 94, 96 may be integrally formed in the ribs 34, 36 so that the base 98 is formed by the ribs 34, 36. Since the ribs 34, 36 may be made from lightweight material such as aluminum materials, and the hook elements 94, 96 may be made from a wear resistance material, such as steel or titanium, the surfaces of the protrusions 100 may have a friction liner 106 made of wear resistance material.

According to some embodiments, as shown in FIGS. 6, 6a, 7, 7a, 11, 14, 15, 22, 26, 30 each or some of the hook elements 94, 96, 94-1-94-4, 96-4 may be single elements, for example shaped essentially in T-shape (or L-shape—not shown), wherein the base 98 is fixed by appropriate fixation means 108 such as bolts, rivets, screws, adhesive to the structure element 33, 35.

Figure 12:
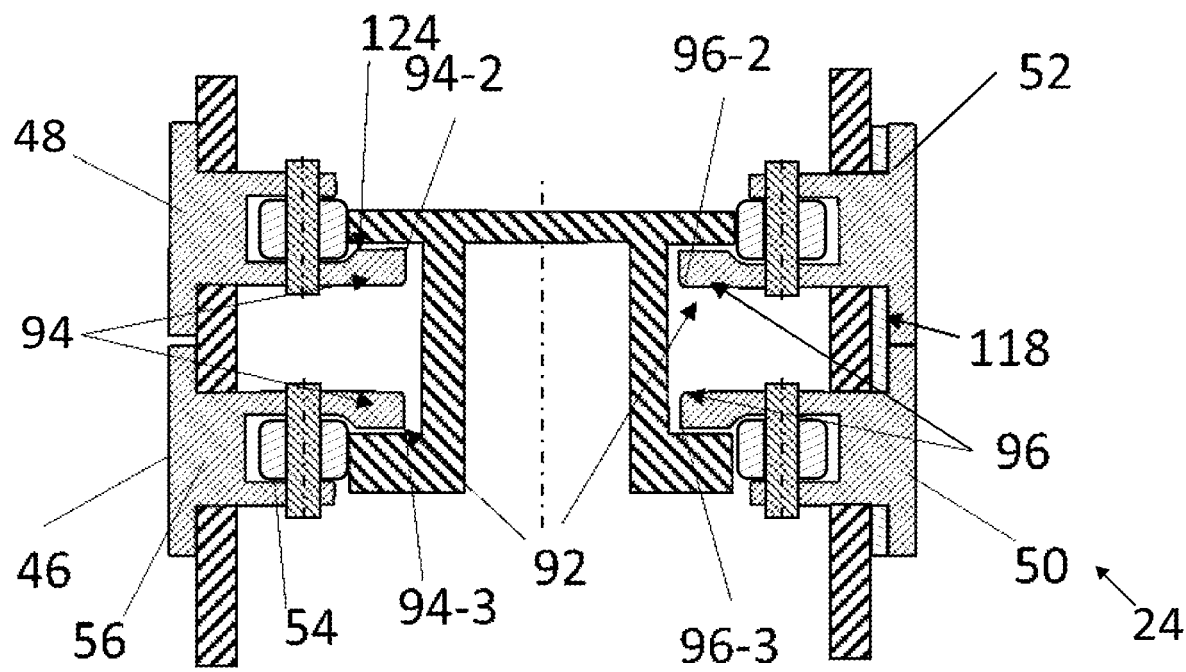
FIG. 12 is a sectional view along the line A-A of FIG. 10 according to the fifth embodiment of the invention.
Figure 13:
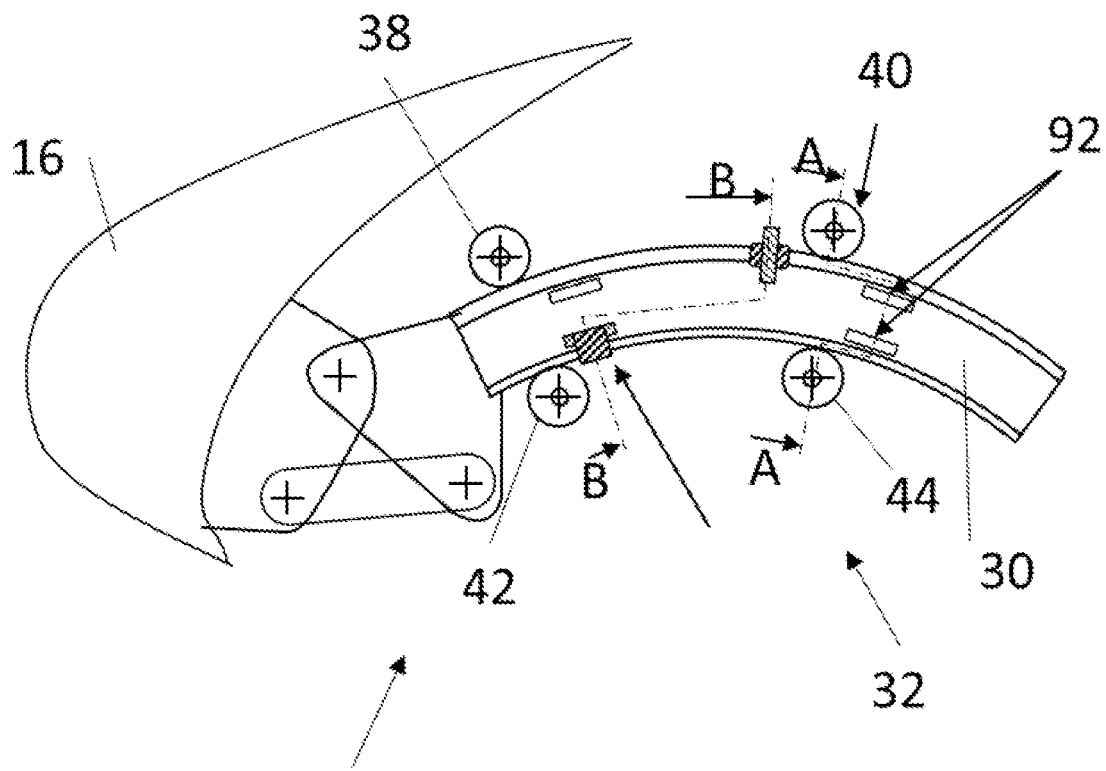
FIG. 13 is a side view, partially in section, of a high-lift device connection arrangement according still further embodiments of the invention.
Figure 14:
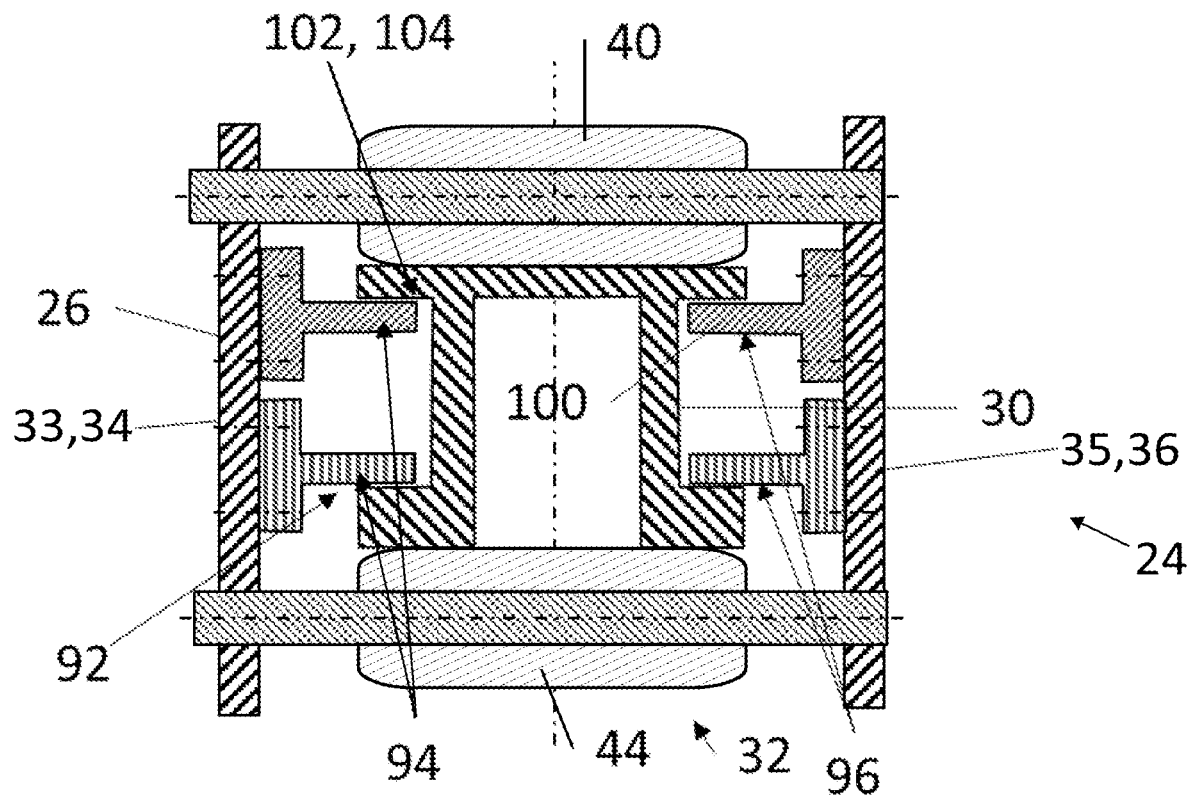
FIG. 14 is a sectional view along the line A-A of FIG. 13 according to a sixth embodiment of the invention.
Figure 15:
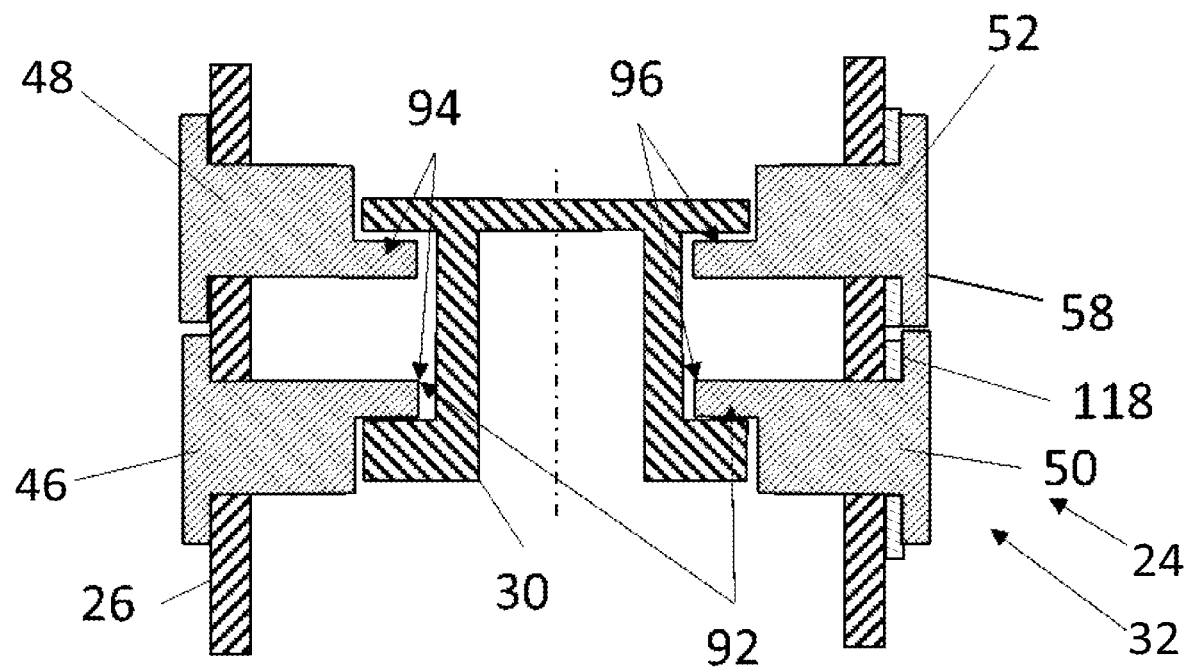
FIG. 15 is a sectional view along the line B-B of FIG. 13 according to the sixth embodiment of the invention.

Referring to FIGS. 12 and 15, a shim plate 114 may be arranged between the base 98 and the structure element 33, 35 in order to set a side clearance between the hook element 94, 96 and the track 30.

The base 98 may have a portion 110 which is configured as (additional) support for the shaft 53, as this is shown in the embodiments of FIGS. 17, 19 and 20 to 32. A similar configuration is also possible for the other embodiments.

Figure 20:
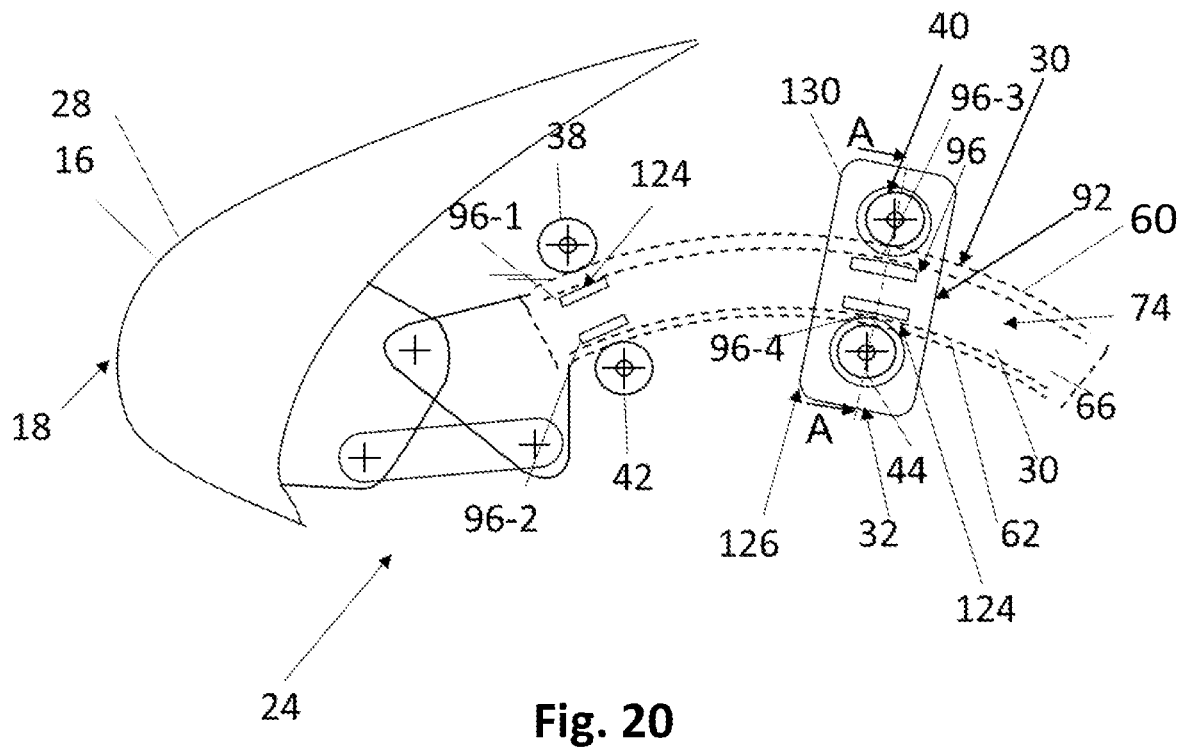
FIG. 20 is a side view, partially in section, of a high-lift device connection arrangement according to some further embodiments of the invention.
Figure 21:
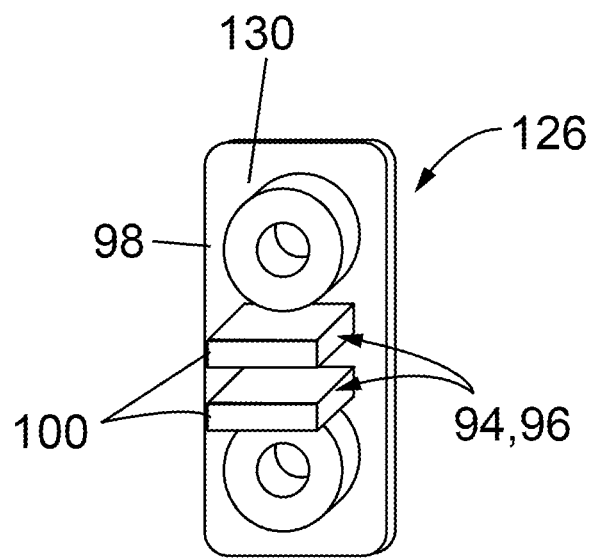
FIG. 21 is a three-dimensional view of a hook/boss module used in the embodiments according to FIG. 20.

FIGS. 20 and 21 show detailed views for such embodiments of the high-lift device connecting arrangement 24 wherein the track catcher 92 with the hook elements 94, 96 is integrated in a boss 130—example for portion 110—for supporting the shafts 53 of the rollers 38-44. FIG. 21 shows a 3D view of an integrated hook/boss-module 126. The hook/boss module 126 has the primary main roller-bolt-support-boss 130 and, integrated therewith, the respective hook element 94, 96.

Figure 22:
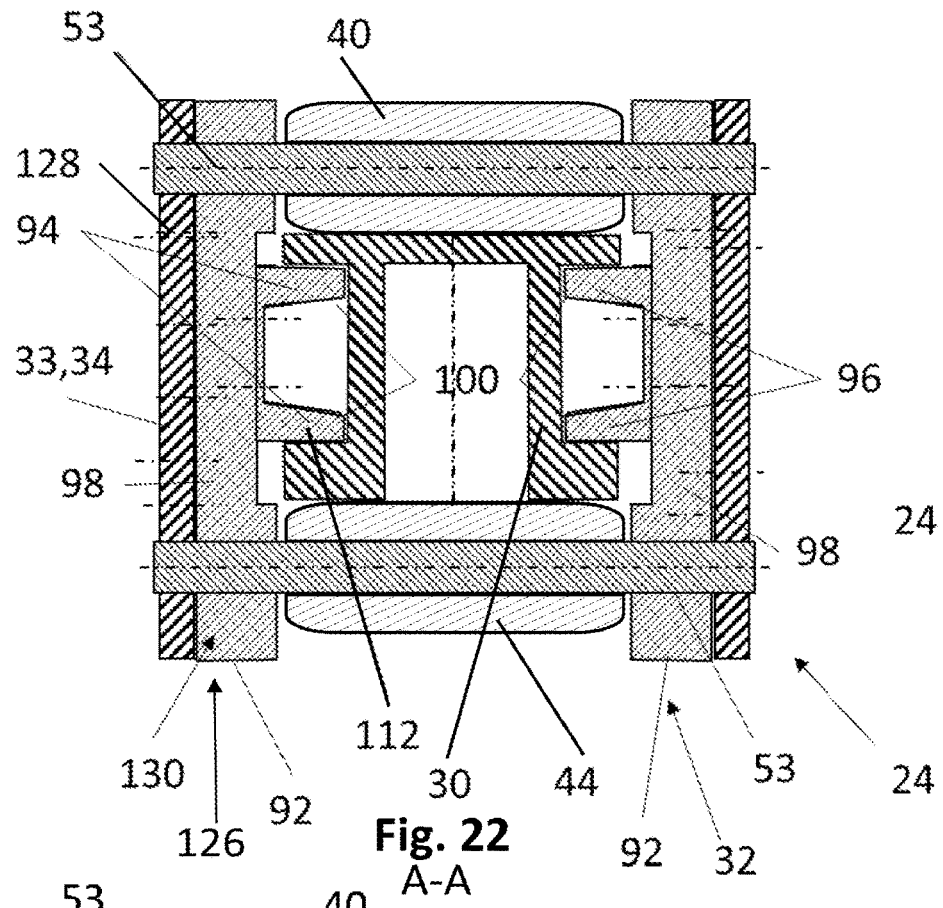
FIG. 22 is a sectional view along the line A-A of FIG. 20 according to a ninth embodiment of the invention.
Figure 23:
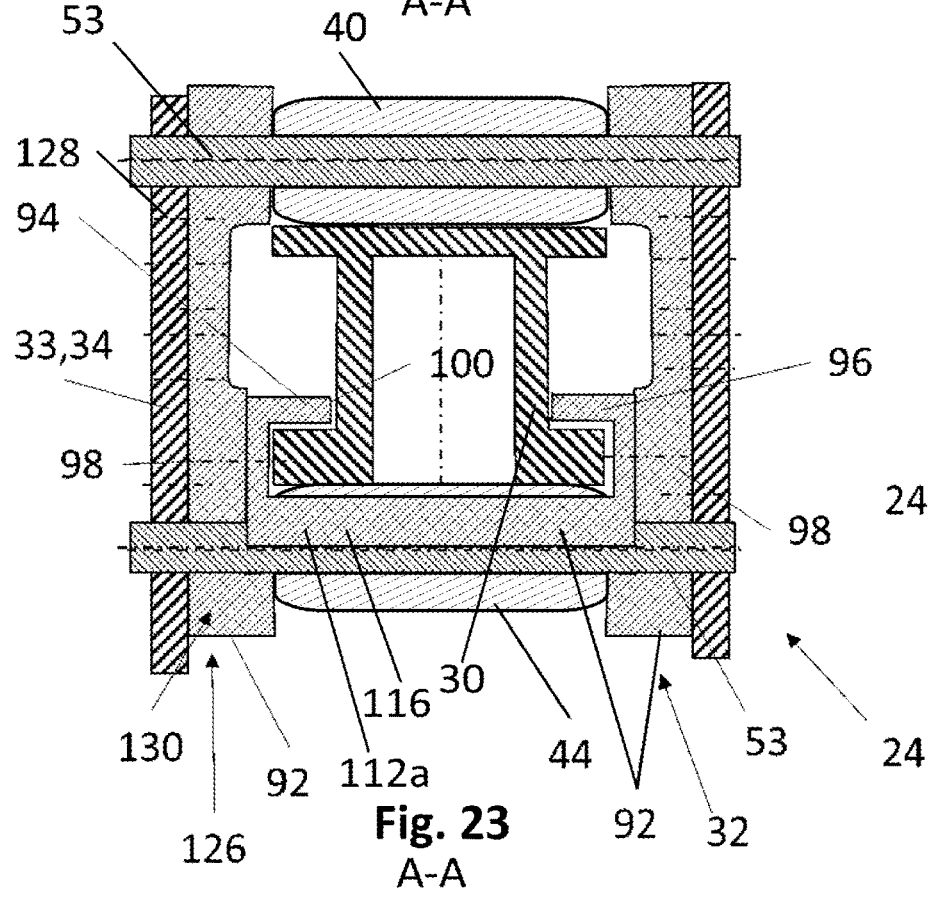
FIG. 23 is a sectional view along the line A-A of FIG. 20 according to a tenth embodiment of the invention.
Figure 24:
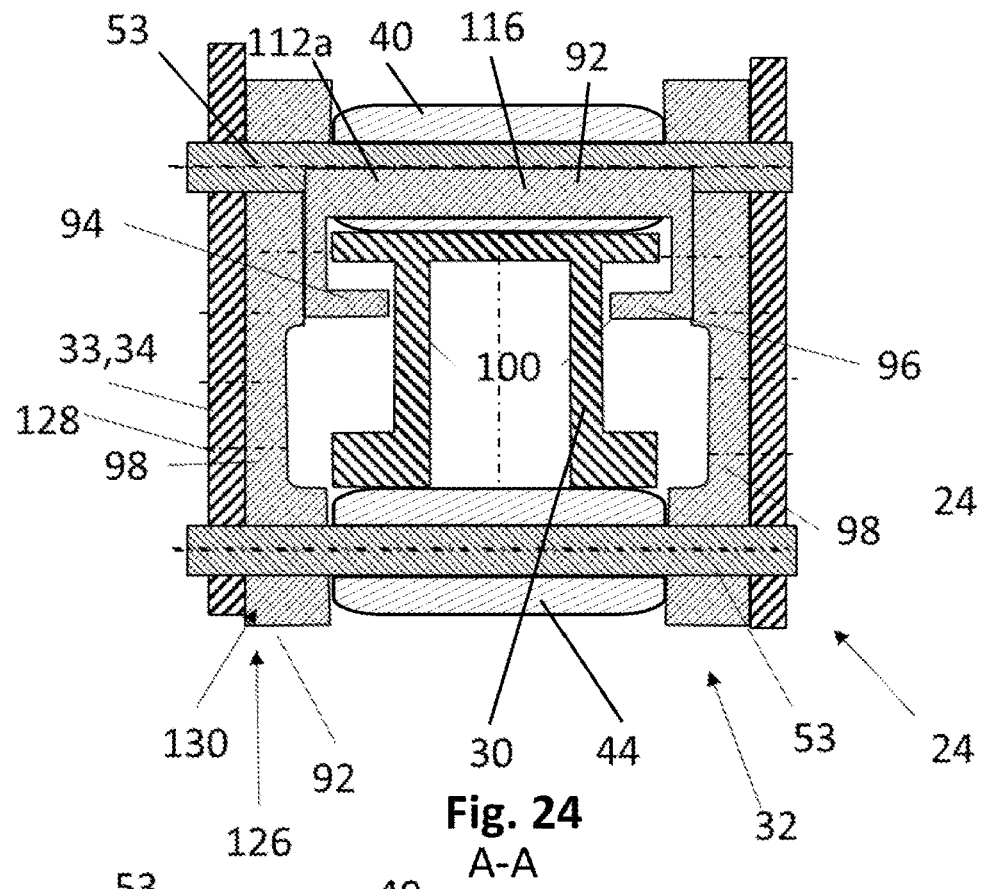
FIG. 24 is a sectional view along the line A-A of FIG. 20 according to an eleventh embodiment of the invention.
Figure 25:
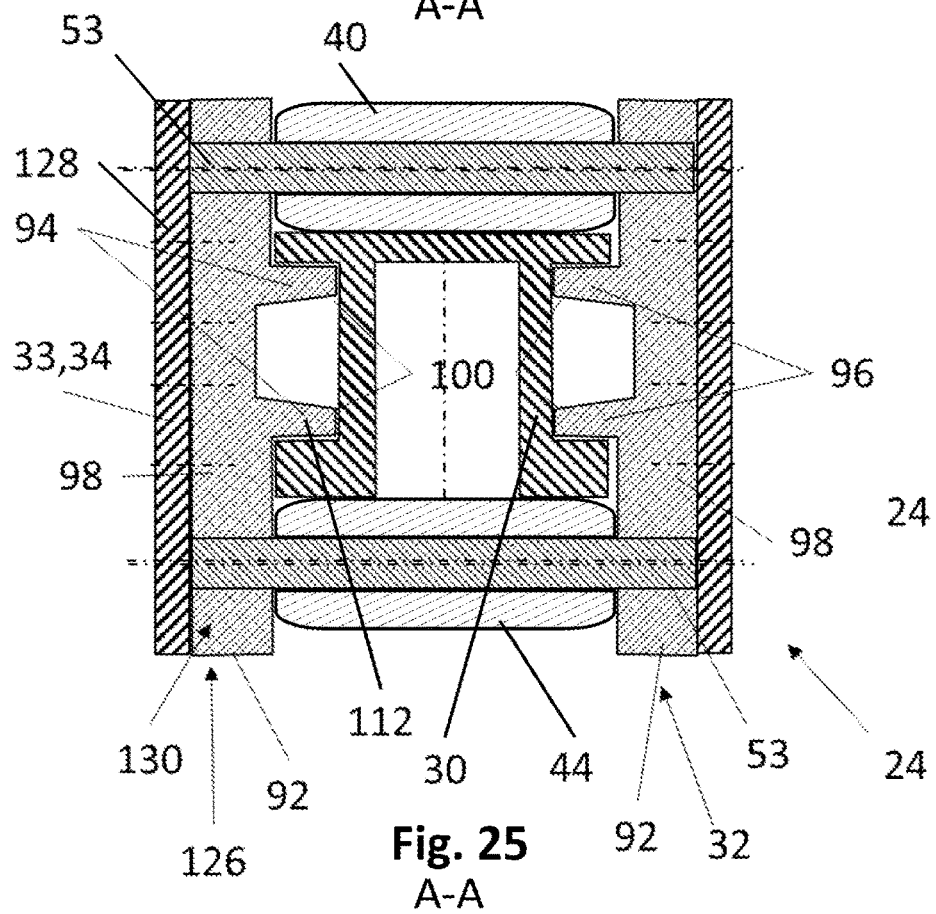
FIG. 25 is a sectional view along the line A-A of FIG. 20 according to a twelfth embodiment of the invention.
Figure 26:
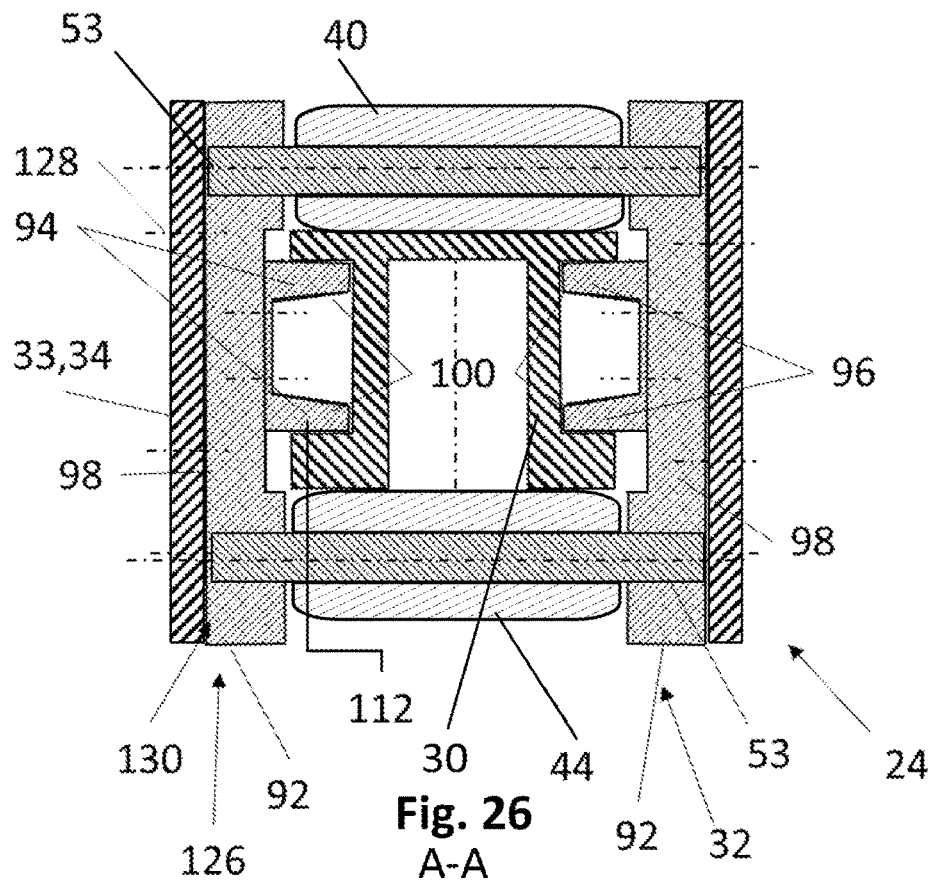
FIG. 26 is a sectional view along the line A-A of FIG. 20 according to a thirteenth embodiment of the invention.
Figure 27:
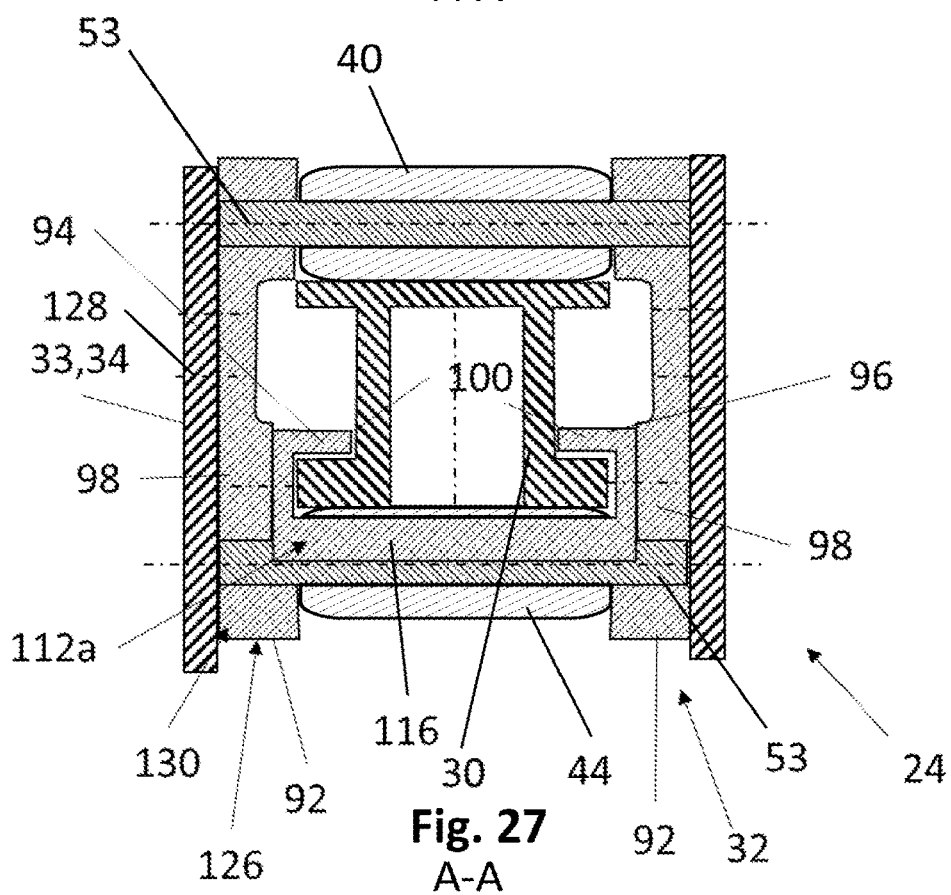
FIG. 27 is a sectional view along the line A-A of FIG. 20 according to a fourteenth embodiment of the invention.
Figure 28:
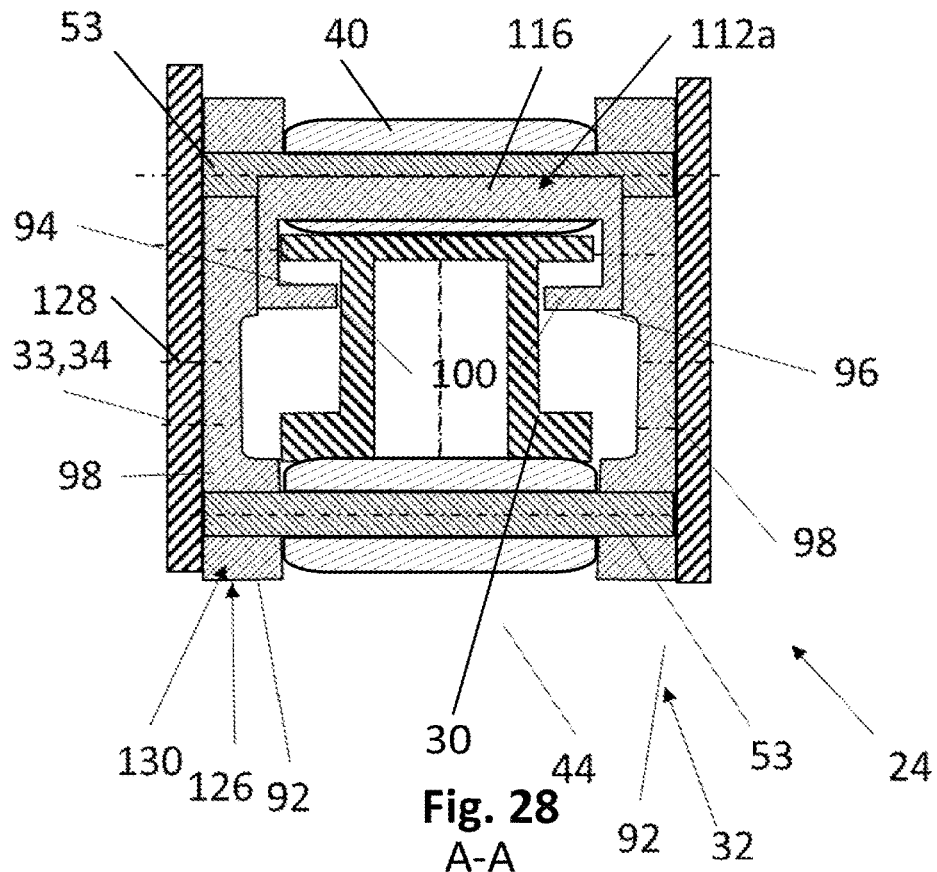
FIG. 28 is a sectional view along the line A-A of FIG. 20 according to a fifteenth embodiment of the invention.
Figure 29:
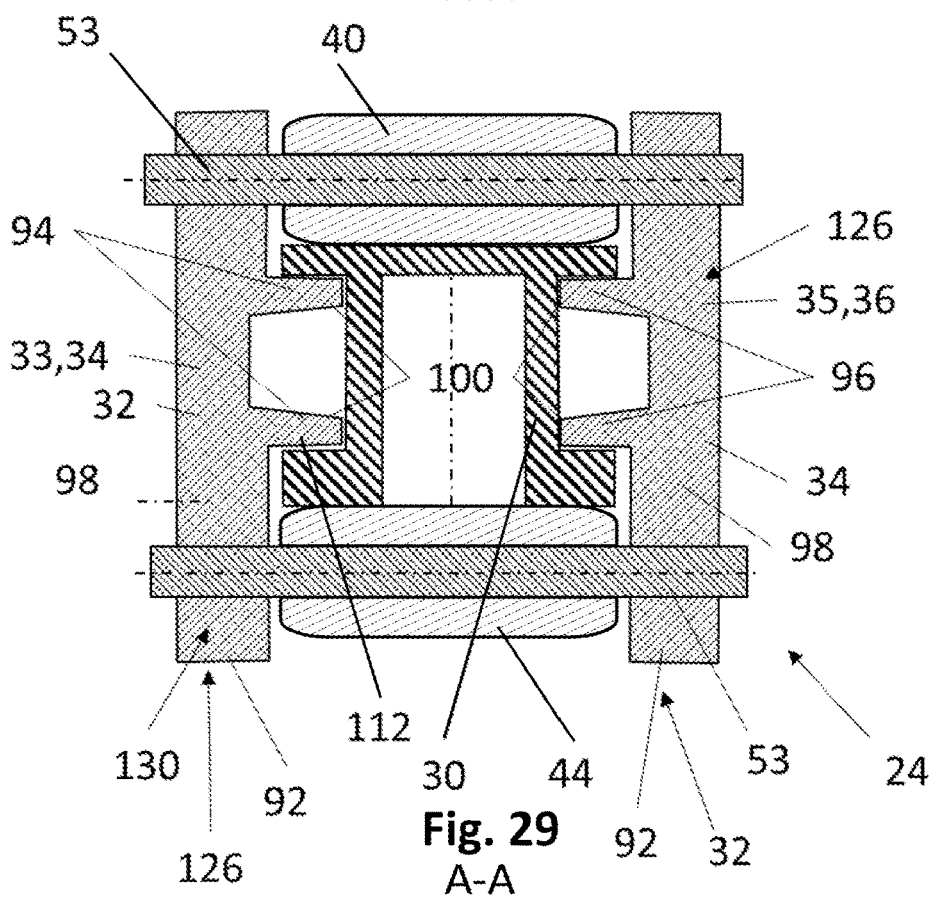
FIG. 29 is a sectional view along the line A-A of FIG. 20 according to a sixteenth embodiment of the invention.
Figure 30:
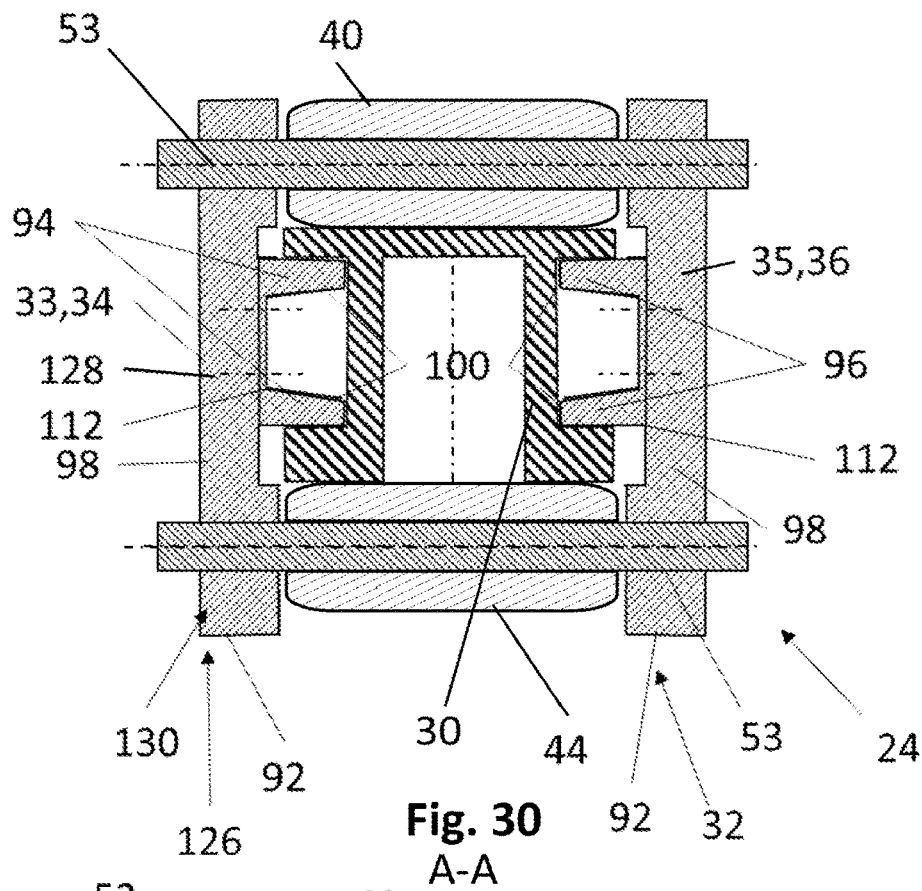
FIG. 30 is a sectional view along the line A-A of FIG. 20 according to a seventeenth embodiment of the invention.
Figure 31:
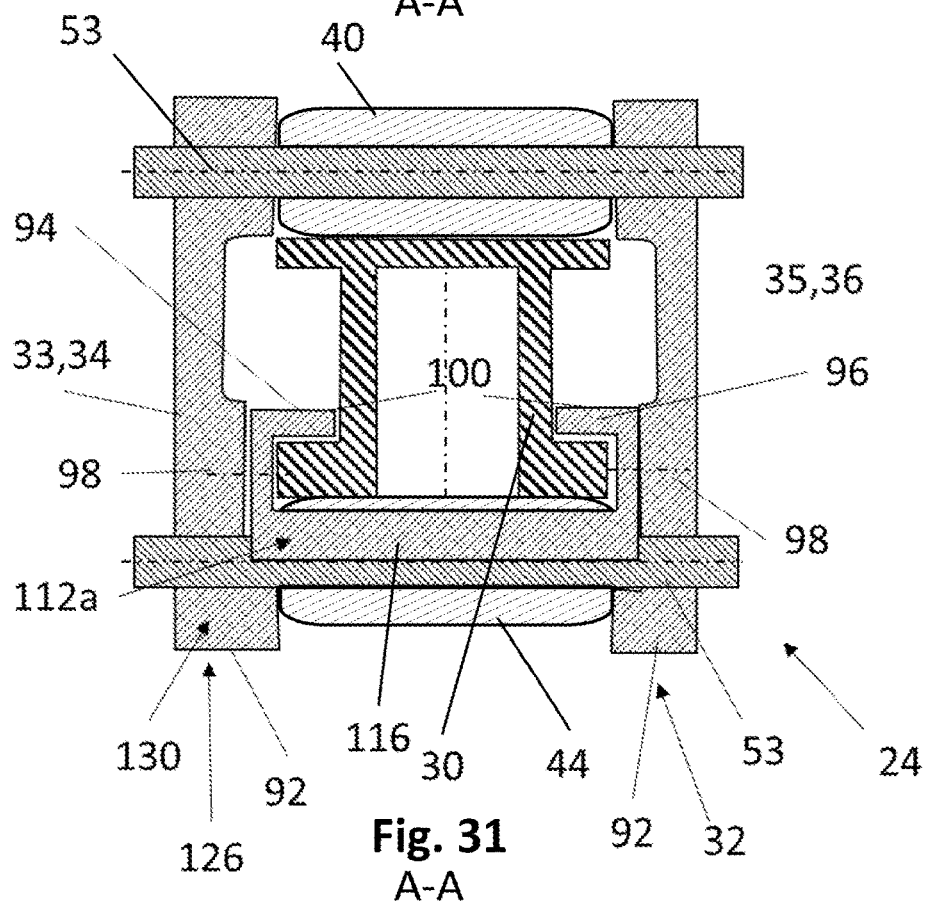
FIG. 31 is a sectional view along the line A-A of FIG. 20 according to an eighteenth embodiment of the invention.
Figure 32:
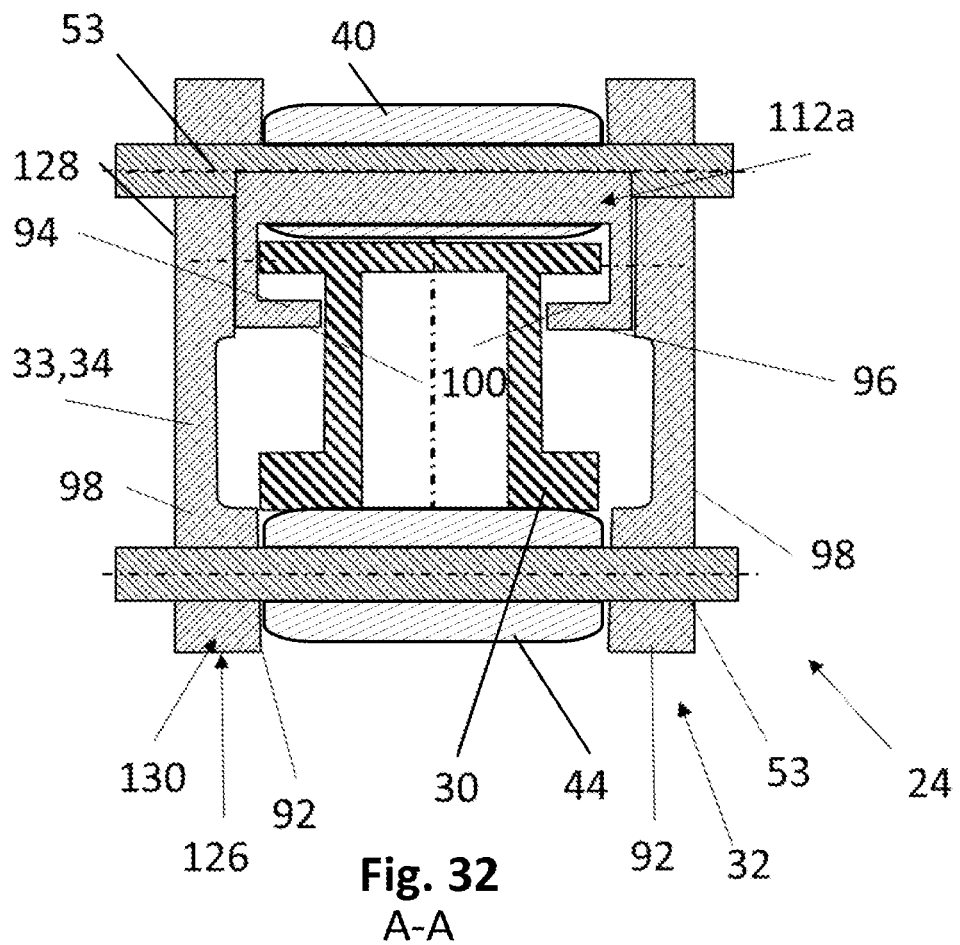
FIG. 32 is a sectional view along the line A-A of FIG. 20 according to a nineteenth embodiment of the invention.

According to some embodiments as shown in FIGS. 19, and 22 to 28 the hook/boss-module 126 might be attached to the leading-edge rib 34, 36 per bolts 128 and/or the roller bolts. Hence, a modular configuration for the guide arrangement 32 is established. For manufacturing reasons, some embodiments of the modular configuration as shown in FIGS. 22 to 24 have a clearance fit between main roller-bolt and fixed leading-edge rib 34, 36. According to some further embodiments as shown in FIGS. 25 to 28, there is no interface between main roller bolt and fixed leading edge rib 34, 36. This may also have advantages for manufacturing reasons.

Instead of a modular configuration, also an integrated configuration of the guide arrangement 32 is possible: As visible in FIGS. 17 and 29 to 32, the integrated hook/boss module 126 may be integrated as feature in the leading-edge rib 34, 36.

A pair of lower and upper hook elements 94-1/94-3, 94-2/94-4, 96-1/96-3, 96-2/96-4 may be integrated in one side bracket 112 as this is shown in FIGS. 7, 7a, 17, 19, 22, 25, 2629, 30.

Figure 8:
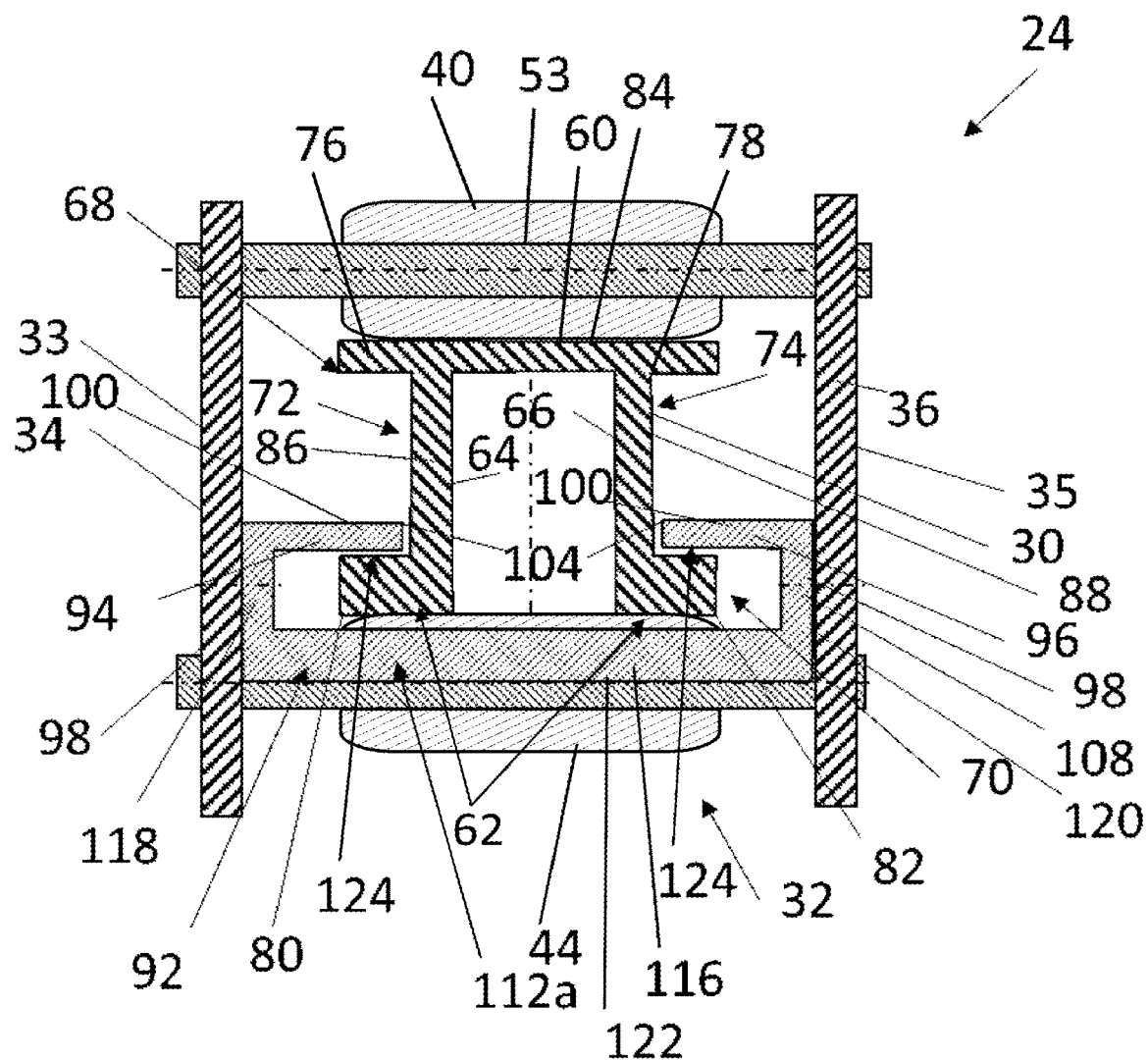
FIG. 8 is a sectional view along the line A-A of FIG. 5 according to a third embodiment of the invention.
Figure 8A:
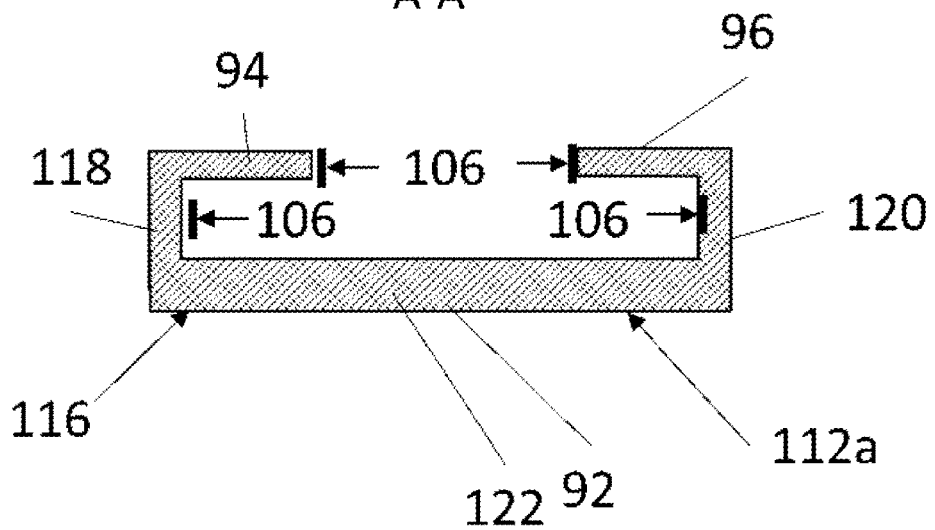
FIG. 8a is a modification of a track catcher with hook elements used in the third embodiment.
Figure 9:
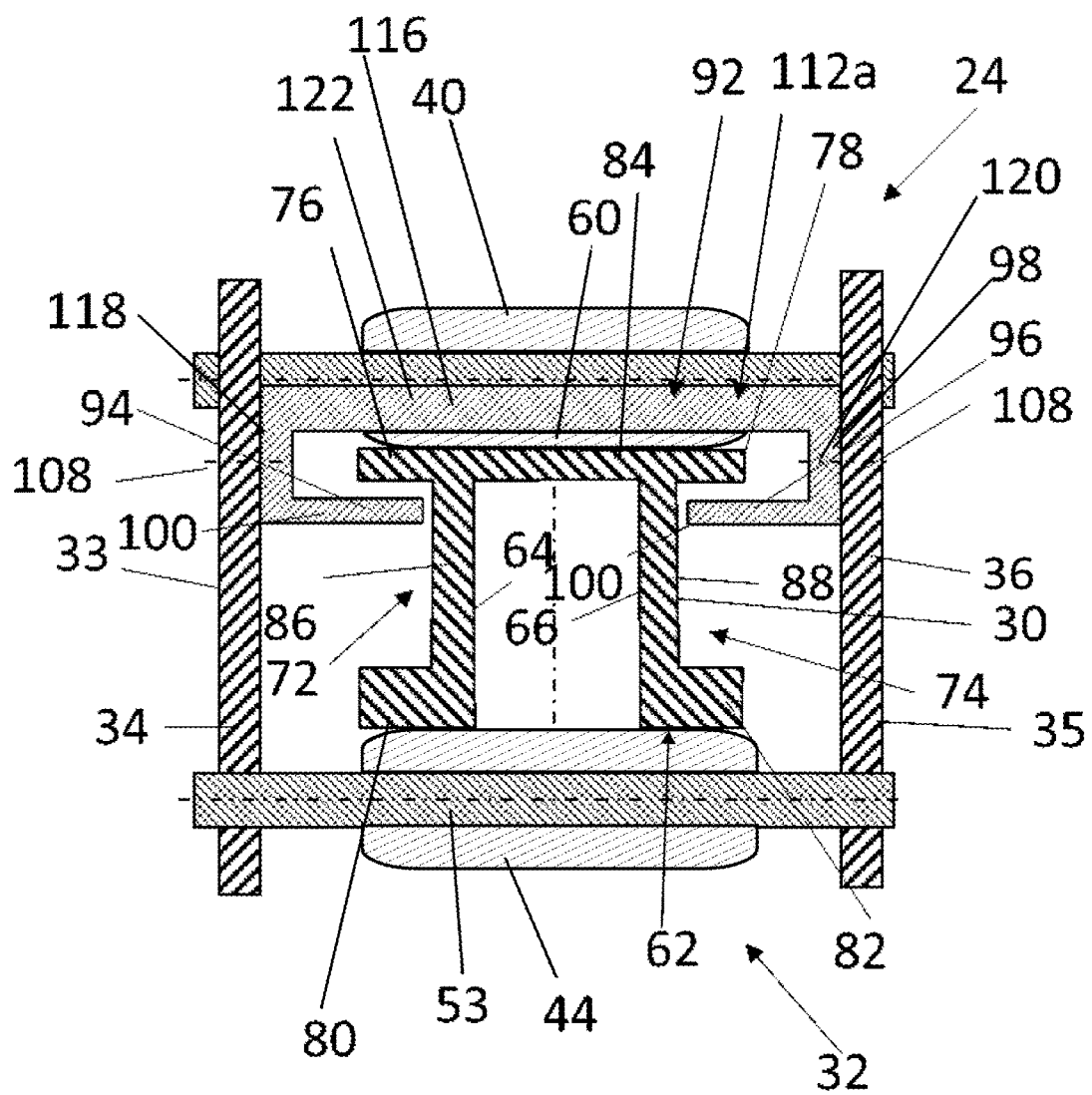
FIG. 9 is a sectional view along the line A-A of FIG. 5 according to a fourth embodiment of the invention.
Figure 9A:
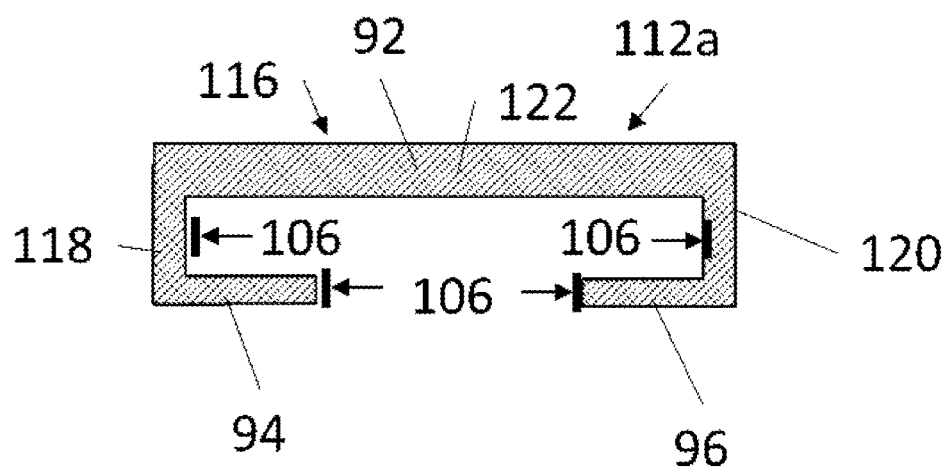
FIG. 9a is a modification of a track catcher with hook elements used in the fourth embodiment.
Figure 10:
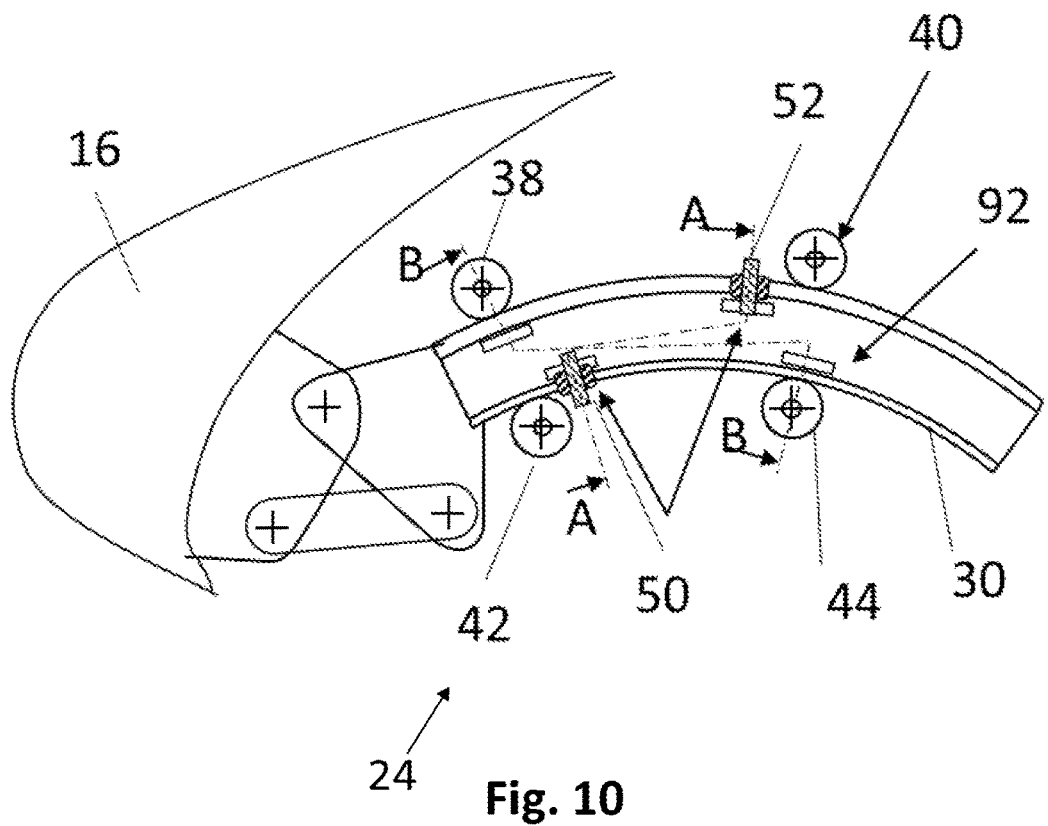
FIG. 10 is a side view, partially in section, of a high-lift device connection arrangement according still further embodiments of the invention.
Figure 11:
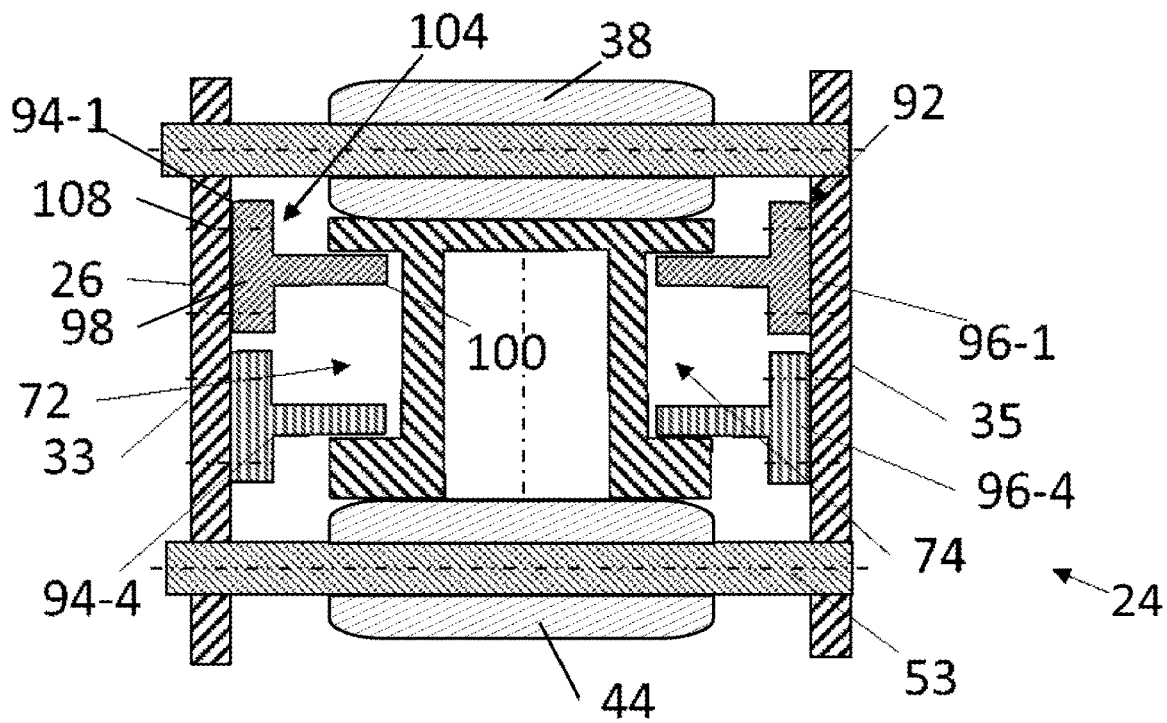
FIG. 11 is a sectional view along the line B-B of FIG. 10 according a fifth embodiment of the invention.

Referring the FIGS. 8, 8a, and 9, 9a and to FIGS. 23, 24, 27, 28, 31, and 32 the first and second hook elements 94, 96 may be integrated in one bridging bracket 112a bridging the two structure elements 33, 35. For example, as shown in FIGS. 8 and 9, the track catcher 92 has a C-shaped profile 116 with a first leg 118 one the first side and the first hook element 94 on the end of the first leg 118, a second leg 120 on the second side and the second hook element 96 on the end of the second leg 120, and a web 122 connecting the other ends of the first and second legs 118, 120. The web 122 is arranged with clearance close to the upper surface of the track 30 (FIG. 9) or to the lower surface of the track (FIG. 8).

Such bridging bracket 112a is a back-up safety element both for failure of the upper main roller 38, 40 and the lower main roller 42, 44, so that it is not necessary to provide both upper hook elements and lower hook elements.

As may be noted from FIGS. 8 and 9, such bracket 112 also functions with tracks 30 where those flanges that are not surrounded (upper flanges 76, 78 in FIG. 8, lower flanges 80, 82 in case of FIG. 9) by the bracket 112 are omitted.

According to the embodiments of FIGS. 12 and 15, the hook elements 94, 96 can be integrated in the side guidance elements 46-52, for example as part of the side roller supports 56 and/or as part of the side guide pad 58.

The features of the different embodiments can be combined as needed. Especially, different combinations of different hook elements are possible.

The embodiments described relate to a high-lift device connection assembly (24) for movably connecting a high lift device (16) to a wing (14) of an aircraft (10) wherein a track (30) is movably guided between main rollers (38, 40, 42, 44). In order to provide an enhanced fall back safety feature in case of a failure of a roller the embodiments include a track catcher (92) to be attached to a structure (26) of the wing (14) and configured to bear a load imposed by the track (30) in case of a main roller failure, wherein the track catcher (92) has at least one first hook element (94, 94-1-94-4) engaged within a first recession (72) at a first side of the track (30) and at least one second hook element (96, 96-1-96-4) engaged with a second recession (74) at the second side of the track (30). Further, a wing and an aircraft equipped with such high-lift device connection assembly (24) have been described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the this application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 aircraft
12 body
14 wing
16 high-lift device
18 leading edge
20 trailing edge
22 conventional high-lift device connecting arrangement
24 high-lift device connecting arrangement
26 structure
28 slat
30 track
32 guide arrangement
33 first structure element
34 first rib
35 second structure element
36 second rib
38 forward upper main roller
40 aft upper main roller
42 forward lower main roller
44 aft lower main roller
46 forward first side guidance element
48 aft first side guidance element
50 forward second guidance element
52 aft second guidance element
53 shaft
54 side roller
56 side roller support
58 side guide pad
60 upper surface element
62 lower surface element
64 first vertical element
66 second vertical element
68 first outer side
70 second outer side
72 first recession
74 second recession
76 first flange
78 second flange
80 third flange
82 fourth flange
84 web (U-shaped track)
86 first leg
88 second leg
90 pin ("funk pin")
92 track catcher
94 first hook element
94-1 forward upper first hook element
94-2 aft upper first hook element
94-3 forward lower first hook element
94-4 aft lower first hook element
96 second hook element
96-1 forward upper second hook element
96-2 aft upper second hook element
96-3 forward lower second hook element
96-4 aft lower second hook element
98 base
100 protrusion
102 free end
104 functional surface
106 liner
108 fixation means
110 portion of base
112 side bracket
112a bridging bracket
114 shim plate
116 C-shaped profile
118 first leg (C-shape)
120 second leg (C-shape)
122 web (C-shape)
124 contact surface
126 hook/boss-module
128 bolt
130 boss

The invention claimed is:

1. A high-lift device connection assembly configured to movably connect a high lift device to a wing of an aircraft, the high-lift device connection assembly comprising:
 a track configured to hold the high-lift device, and
 a guide arrangement configured to be installed on a structure of the wing and configured to guide forward and backward movement of the track, wherein the guide arrangement includes an upper main roller and a lower main roller, and a first side guidance element and second side guidance element,
 wherein the track is a profiled beam with an upper surface element configured to be contacted by the upper main roller and a lower surface element configured to be contacted by the lower main roller,
 wherein the track includes at least one vertical element connecting the upper surface element and the lower surface element, and is offset from outer edges of at least one of the upper surface element and the lower surface element,
 wherein a first recession is at a first side of the track and a second recession is at a second side of the track,
 wherein the guide arrangement comprises a track catcher configured to bear a load imposed by the track in case of a failure of the first or second main rollers,
 wherein the track catcher includes a base abutting the at least one vertical element, a first hook element engaged within the first recession at a first side of the track and a second hook element engaged with the second recession at the second side of the track,
 wherein the base and one of the first hook element and the second hook element are a single piece integral component, and
 wherein the base includes a boss configured to receive a shaft of the upper main roller or the lower main roller.

2. The high-lift device connection assembly according to claim 1, wherein each of the at least one first hook element and the second hook element each comprise at least one of:
 a protrusion projecting from a base into the recession,
 is configured to be attached to the structure of the wing,
 has a L-shaped, T-shaped or U-shaped profile;
 has a curved upper or lower surface configured to engage with a curved upper wall or a curved lower wall of the recession;
 is arranged with a clearance within the recession;
 is integrated in a structure element of the structure of the wing;
 is integrated in the first or second side guidance element;
 is configured to be connected to the structure of the wing with at least one shim plate therebetween; and
 has a free end arranged close to the at least one vertical element with a clearance therebetween configured to bear a load imposed by the track in case of a side guidance element failure.

3. The high-lift device connection assembly according to claim 1, wherein track catcher comprises at least one of:
at least one of the first hook element and the second hook element is associated with one of the upper and lower main rollers;
a C-shaped profile with a first leg on the first side and the first hook element on the end of the first leg, a second leg on the second side and the second hook element on the end of the second leg, and a web connecting the other ends of the first and second legs, wherein the web is arranged with clearance close to the upper surface of the track or to the lower surface of the track;
upper and lower first and second hook elements;
forward and aft first and second hook elements; and
a first vertical surface and a second vertical surface each arranged in parallel with clearance therebetween to a first side surface and a second side surface, respectively, of the upper or lower surface element and configured to bear a load imposed by the track in case of a side guidance element failure.

4. The high-lift device connection assembly according to claim 1, wherein the track comprises at least one of:
a U-shaped profile with flanges at respective ends of the U-shaped profile such that one of the upper surface element and the lower surface element is formed by a web of the U-shaped profile, and a first flange and a second flange, the at least one vertical element is formed by a first leg and a second leg of the U-shaped profile, and the other of the upper surface element and the lower surface element is formed by a third flange and a fourth flange at the ends of the first and second legs of the U-shaped profile;
is curved to enable a bow shaped moving path of the high-lift device;
holds a slat as the high-lift device; and
holds a leading edge slat as the high-lift device.

5. The high-lift device connection assembly according to claim 1, wherein:
the upper main rollers comprise at least one forward upper main roller and at least one aft upper main roller with a distance in chord direction to the forward upper main roller;
the lower main rollers comprise at least one forward lower main roller and at least one aft lower main roller with a distance in chord direction to the forward lower main roller; and
each of the upper and lower main rollers have a bearing arranged on a shaft configured to be fixed between the first structure element and the second structure element of the wing.

6. The high-lift device connection assembly according to claim 1, wherein a clearance in a range of 0.1 mm to 10 mm is between the first hook element and one of the upper surface element or the lower surface element.

7. The high-lift device connection assembly according to claim 1, wherein the side guidance elements are side rollers.

8. A high-lift device connection assembly configured to movably connect a high lift device to a wing of an aircraft, the high-lift device connection assembly comprising:
a track configured to hold the high-lift device and configured to extend forward of the wing, wherein the track includes an upper flange, a lower flange and at least one web connecting the upper flange to the lower flange and substantially perpendicular to the upper flange and the lower flange;
a guide arrangement configured to be fixed to a structure of the wing and configured to guide forward and backward movement of the track, wherein the guide arrangement includes:
an upper main roller configured in rolling contact with an upper surface of the upper flange and a lower main roller in rolling contact with a lower surface of the lower flange, wherein the upper main roller and lower main roller support the track;
side guidance elements each engaging an edge region of the upper flange or the lower flange, and
a track catcher configured to bear a load imposed by the track on the guide arrangement, the track catcher includes a holder for each of the side guidance elements, a first hook element and a second hook element each adjacent a bearing surface, wherein the bearing surface is a lower surface of the upper flange or an upper surface of the lower flange,
wherein the first hook element extends towards a first side of the at least one web and the second hook element extends towards a second side, opposite the first side, of the at least one web, and
wherein a clearance in a range of 0.1 mm to 10 mm exists between the bearing surface and each of the first hook element and the second hook element while the upper and lower main rollers are operating in a non-failure mode, and
at least one of the first hook element and the second hook element is in sliding contact with the bearing surface while at least one of the upper and lower main rollers are in a failure mode.

9. The high-lift device connection assembly of claim 8, wherein the structure includes a first rib of the wing and a second rib of the wing, and the track and guide arrangement are between the first and second ribs, and
wherein the first hook element is fixed to the first rib and extends from the first rib towards the first side of the at least one web, and the second hook is fixed to the second rib and extends from the second rib towards the second side of the at least one web.

10. The high-lift device connection assembly of claim 8, wherein the bearing surface is a first bearing surface and the first bearing surface is the lower side of the upper flange, and the track catcher further comprises:
a third hook element engaged within the first recession at the first side of the track, a fourth hook element engaged with the second recession at the second side of the track, and the third and fourth hook element are each adjacent a second bearing surface which is the upper side of the lower flange; and
wherein a clearance exists between the second bearing surface and each of the third and fourth hook elements while the upper and lower main rollers are operating in a non-failure mode, and at least one of the third and fourth hook elements are in sliding contact with the second bearing surface while at least one of the upper and lower main rollers are in a failure mode.

11. The high-lift device connection assembly of claim 10, wherein the first and third hook elements are a single piece component including a first protrusion forming the first hook element, a second protrusion forming the third hook element and a base connecting the first and second protrusions.

12. The high-lift device connection assembly of claim 8, wherein the track catcher includes a first base and a second base each configured to attached to the structure of the wing and from which extends a boss with an aperture to receive an axel of one of the upper or lower main rollers, wherein the first hook element extends from the first base and the second hook element extends from the second base.

\* \* \* \* \*